(12) United States Patent
Buer et al.

(10) Patent No.: US 10,727,934 B2
(45) Date of Patent: Jul. 28, 2020

(54) GROUND-BASED BEAMFORMED COMMUNICATIONS USING MUTUALLY SYNCHRONIZED SPATIALLY MULTIPLEXED FEEDER LINKS

(71) Applicant: ViaSat, Inc., Carlsbad, CA (US)

(72) Inventors: Kenneth Buer, Gilbert, AZ (US); Charles Pateros, Carlsbad, CA (US); William Ralston, Fallbrook, CA (US)

(73) Assignee: VIASAT, Inc., Carlsbad, CA (US)

( * ) Notice: Subject to any disclaimer, the term of this patent is extended or adjusted under 35 U.S.C. 154(b) by 0 days.

(21) Appl. No.: 16/387,284

(22) Filed: Apr. 17, 2019

(65) Prior Publication Data

US 2020/0028575 A1    Jan. 23, 2020

Related U.S. Application Data

(63) Continuation of application No. PCT/US2017/057723, filed on Oct. 20, 2017.
(Continued)

(51) Int. Cl.
*H04B 7/185* (2006.01)
*H04B 7/026* (2017.01)
(Continued)

(52) U.S. Cl.
CPC ......... *H04B 7/18513* (2013.01); *H04B 7/026* (2013.01); *H04B 7/0617* (2013.01);
(Continued)

(58) Field of Classification Search
CPC .................................................. H04B 7/18513
See application file for complete search history.

(56) References Cited

U.S. PATENT DOCUMENTS 3,835,469 A    9/1974   Chen et al.
4,232,266 A   11/1980   Acampora
(Continued)

FOREIGN PATENT DOCUMENTS

EP    0860952 A2    8/1998
EP    1168672 A2    1/2002
(Continued)

OTHER PUBLICATIONS

Angeletti et al., "On-ground digital beamforming techniques for satellite smart antennas", https://www.researchgate.net/publication/228965638, Proc. 19th AIAA, Apr. 2001, 8 pgs.
(Continued)

*Primary Examiner* — Ankur Jain
(74) *Attorney, Agent, or Firm* — Kilpatrick Townsend & Stockton, LLP

(57) ABSTRACT

Embodiments provide ground-based beamforming with mutually synchronized spatially multiplexed gateways in a wireless communications system. Some embodiments operate in context of a satellite having a focused-beam feeder antenna that communicates with multiple, geographically distributed gateway terminals (e.g., single gateway per beam), and a user antenna that provides communications with user terminals via formed user beams. The gateway terminals can communicate feeder signals that are beam-weighted and mutually phase-synchronized (e.g., according to satellite and/or loopback beacons). For example, the synchronization can enable forward uplink signals to be phase-synchronously received by the satellite, and the beam weighting can enable the forward downlink signals to spatially combine to form forward user beams. Embodiments can achieve extensive bandwidth reuse through mutually synchronized spatial multiplexing of the feeder-link communications.

49 Claims, 14 Drawing Sheets

Related U.S. Application Data

(60) Provisional application No. 62/411,377, filed on Oct. 21, 2016.

(51) Int. Cl.
*H04B 7/06* (2006.01)
*H04B 7/204* (2006.01)
*H04B 7/212* (2006.01)

(52) U.S. Cl.
CPC ....... *H04B 7/18517* (2013.01); *H04B 7/2041* (2013.01); *H04B 7/2125* (2013.01)

(56) References Cited

U.S. PATENT DOCUMENTS

| | | | |
|---|---|---|---|
| 4,825,216 A | 4/1989 | Dufort | |
| 4,931,802 A | 6/1990 | Assal et al. | |
| 5,734,345 A | 5/1998 | Chen et al. | |
| 6,014,372 A * | 1/2000 | Kent | H04B 7/2041 370/316 |
| 6,016,124 A * | 1/2000 | Lo | H01Q 3/26 342/373 |
| 6,240,072 B1 * | 5/2001 | Lo | H04B 7/2041 370/316 |
| 6,307,507 B1 * | 10/2001 | Gross | H01Q 1/288 342/354 |
| 6,317,420 B1 * | 11/2001 | Schiff | H04B 7/18539 370/325 |
| 6,671,227 B2 * | 12/2003 | Gilbert | G01S 7/52085 367/138 |
| 6,788,661 B1 * | 9/2004 | Ylitalo | H04B 7/0617 342/359 |
| 6,795,413 B1 * | 9/2004 | Uhlik | H04W 48/12 370/330 |
| 6,823,170 B1 * | 11/2004 | Dent | H04B 7/18515 342/368 |
| 6,941,138 B1 * | 9/2005 | Chang | H04B 7/18504 455/12.1 |
| 7,016,649 B1 * | 3/2006 | Narasimhan | H01Q 1/246 455/552.1 |
| 7,068,974 B1 * | 6/2006 | Linsky | H04B 7/18515 455/12.1 |
| 7,257,418 B1 * | 8/2007 | Chang | H04B 7/18545 455/12.1 |
| 7,305,211 B2 | 12/2007 | Dent | |
| 7,426,386 B1 * | 9/2008 | Yousefi | H04B 7/2041 342/117 |
| 7,609,666 B2 * | 10/2009 | Karabinis | H04B 7/2041 370/316 |
| 7,627,285 B2 * | 12/2009 | Karabinis | H04B 7/2041 455/12.1 |
| 7,634,229 B2 * | 12/2009 | Karabinis | H04B 7/18513 370/316 |
| 7,706,748 B2 * | 4/2010 | Dutta | H04B 7/2041 370/316 |
| 7,728,766 B2 * | 6/2010 | Draganov | H04B 7/2041 342/354 |
| 7,777,674 B1 * | 8/2010 | Haddadin | H01Q 1/28 342/368 |
| 7,787,819 B2 | 8/2010 | Walker et al. | |
| 7,831,202 B2 * | 11/2010 | Karabinis | H04B 7/18532 343/705 |
| 7,869,759 B2 * | 1/2011 | Pateros | H04B 7/1858 455/12.1 |
| 7,970,346 B2 | 1/2011 | Karabinis | |
| 7,911,372 B2 * | 3/2011 | Nelson | G01S 13/003 342/179 |
| 7,925,232 B2 * | 4/2011 | Barak | H04B 7/18513 455/196.1 |
| 8,130,140 B2 | 3/2012 | Draganov et al. | |
| 8,144,643 B2 * | 3/2012 | Miller | H04B 7/2041 370/321 |
| 8,218,476 B2 | 7/2012 | Miller | |
| 8,265,646 B2 * | 9/2012 | Agarwal | H04B 7/18515 370/395.41 |
| 8,270,899 B2 | 9/2012 | Walker et al. | |
| 8,331,329 B2 * | 12/2012 | Sayegh | H04W 88/16 370/335 |
| 8,385,817 B2 * | 2/2013 | Dankberg | H04B 7/2041 455/10 |
| 8,427,368 B1 * | 4/2013 | Freedman | H04B 7/18519 342/358 |
| 8,547,897 B2 * | 10/2013 | Chang | H04B 7/0413 370/316 |
| 8,548,377 B2 * | 10/2013 | Dankberg | H04B 7/18513 455/12.1 |
| 8,660,481 B2 * | 2/2014 | Miller | H04B 7/18523 455/12.1 |
| 8,744,360 B2 * | 6/2014 | Zheng | H04B 7/18513 455/63.1 |
| 8,767,615 B2 * | 7/2014 | Chang | H04B 7/0413 370/316 |
| 8,855,552 B2 | 10/2014 | Dankberg et al. | |
| 8,923,756 B1 * | 12/2014 | Freedman | H04B 7/2041 455/12.1 |
| 9,014,619 B2 | 4/2015 | Benjamin et al. | |
| 2004/0234018 A1 * | 11/2004 | Ram | H04B 7/18528 375/354 |
| 2007/0281612 A1 * | 12/2007 | Benjamin | H04B 7/18515 455/13.3 |
| 2008/0051080 A1 * | 2/2008 | Walker | H04B 7/2041 455/427 |
| 2008/0165720 A1 * | 7/2008 | Hu | H04B 7/0632 370/315 |
| 2011/0069633 A1 * | 3/2011 | Schmidt | H01Q 1/246 370/254 |
| 2011/0076956 A1 * | 3/2011 | Tronc | H04B 7/18515 455/66.1 |
| 2012/0218141 A1 * | 8/2012 | Vasavada | H01Q 3/267 342/354 |
| 2012/0274507 A1 * | 11/2012 | Cherkaoui | H01Q 1/1264 342/354 |
| 2014/0022979 A1 * | 1/2014 | Chen | H04B 7/15578 370/315 |
| 2014/0099881 A1 * | 4/2014 | Boudreau | H04B 7/0617 455/7 |
| 2014/0104106 A1 * | 4/2014 | Corman | H01Q 3/26 342/363 |
| 2014/0219124 A1 * | 8/2014 | Chang | H04B 7/0413 370/252 |
| 2014/0307664 A1 * | 10/2014 | Chen | H04B 7/0456 370/329 |
| 2016/0006950 A1 | 1/2016 | Sainct et al. | |
| 2016/0308601 A1 | 10/2016 | Mochida | |

FOREIGN PATENT DOCUMENTS

| | | |
|---|---|---|
| EP | 1303927 A2 | 4/2003 |
| KR | 10-1268480 B1 | 6/2013 |
| RU | 2388161 C2 | 4/2010 |
| WO | WO 1995/028015 | 10/1995 |
| WO | WO 1997/024884 | 7/1997 |
| WO | WO 2014/170663 A1 | 10/2014 |
| WO | WO 2016/19581 | 12/2016 |
| WO | WO 2016/209332 A2 | 12/2016 |
| WO | WO 2017/124004 A1 | 7/2017 |

OTHER PUBLICATIONS

Angeletti et al., "Hybrid Space/Ground Beamforming Techniques for Satellite Telecommunications", 32nd ESA Antenna Workshop on Antennas for Space Applications, 2001, 6 pgs.

Angeletti, "Beam Hopping in Multi-Beam Broadband Satellite Systems: System Performance and Payload Architecture Analysis", 24th AIAA International Communications Satellite Systems Conference, https://www.researchgate.net/publication/236334523, 2006, 10 pgs.

(56) References Cited

OTHER PUBLICATIONS

Angeletti et al., "Space/Ground Beamforming Techniques for Satellite Communications", 2010 IEEE Antennas and Propagation Society International Symposium, Jul. 11-17, 2010, 4 pgs.

Anzalchi et al., "Beam Hopping in Multi-Beam Broadband Satellite Systems: System Simulation and Performance Comparison with Non-Hopped Systems", 2010 5th Advanced Satellite Multimedia Systems Conference and the 11th Signal Processing for Space Communications Workshop, Sep. 13-15, 2010, pp. 248-255.

Arapoglou et al., "MIMO over Satellite: A Review", IEEE Communications Surveys & Tutorials, vol. 13, No. 1, 2011, pp. 27-51.

Arnau et al., "Performance study of multiuser interference mitigation schemes for hybrid broadband multibeam satellite architectures", EURASIP Journal on Wireless Communications and Networking, Dec. 2012, 19 pgs.

Bjornson et al., "Optimal Multiuser Transmit Beamforming: A Difficult Problem with a Simple Solution Structure [lecture notes]", IEEE Signal Processing Magazine, vol. 31, No. 4, Jul. 2014, pp. 142-148.

Chiavacci, "Limited Scan Antenna Systems Using Phased-Array Feeds (versus Direct Radiating Array Apertures) Require Fewer Array Elements; or Do They?", IEEE International Conference on Phased Array Systems and Technology, May 21-25, 2000, 7 pgs.

Christopoulos et al., "Coordinated Multibeam Satellite Co-location: The Dual Satellite Paradigm", Submitted to the IEEE Wirless. Comms. Magazine, Mar. 25, 2015, 16 pgs.

Da Costa et al., Cooperative Dual-Hop Relaying Systems with Beamforming over Nakagami-m Fading Channels, IEEE Transactions on Wireless Communications, vol. 8, No. 8, Aug. 2009, pp. 3950-3954.

Devillers et al., "Joint Linear Precoding and Beamforming for the Forward Link of Multi-Beam Broadband Satellite Systems", IEEE Global Telecommunications Conference, Dec. 5-9, 2011, 6 pgs.

Di Cecca et al., "Payload aspects of mobile satellite systems with on-ground beamforming and interference cancellation", IEEE International Conference on Wireless Information Technology and Systems, ISBN: 978-1-4673-0947-9, Nov. 11, 2012, 4 pgs.

Döttling, "Assessment of advanced beamforming and MIMO technologies", European Commission, Project Deliverable IST-2003-507581 Winner, Information Society Technologies, Feb. 28, 2005, pp. 1-190.

ESA/ESTEC, Proceedings, 32nd ESA Antenna Workshop on Antennas for Space Applications, From Technologies to Architectures, Noordwijk, The Netherlands, Oct. 5-8, 2010, 18 pgs.

Fan et al., "MIMO Configurations for Relay Channels: Theory and Practice", IEEE Transactions on Wireless Communications, vol. 6, No. 5, May 2007, pp. 1774-1786.

Fonseca et al., "Multi-Beam Reflector Antenna System Combining Beam Hopping and Size Reduction of Effectively Used Spot", IEEE Antennas and Propagation Magazine, vol. 54, No. 2, Apr. 2012, pp. 89-99.

Gao et al., "Distributed Ground-based Beamforming", 31st AIAA International Communications Satellite Systems Conference, Oct. 14-17, 2013, 8 pgs.

Greda et al., "A Satellite Multiple-Beam Antenna for High-Rate Data Relays", Progress in Electromagnetics Research, vol. 149, 2014, pp. 133-145.

Heath Jr. et al., "Multiuser MIMO in Distributed Antenna Systems", 2010 Conference Record of the Forty Fourth Asilomar Conference on Signals, Systems and Computers (ASILOMAR), Nov. 7-10, 2010, 5 pgs.

Howell, "Limited Scan Antennas", Antennas and Propagation Society International Symposium, IEEE, Jun. 10-12, 1974, pp. 117-120.

Ingram et al., "LEO Download Capacity Analysis for a Network of Adaptive Array Ground Stations", Georgia Institute of Technology, 2005, 7 pgs.

Ingram et al., "Optimizing Satellite Communication With Adaptive and Phased Array Antennas", Georgia Institute of Technology, 2004, 7 pgs.

Khan et al., "Ground Based and Onboard Based Beamforming for Hybrid Terrestrial-Satellite Mobile System", 28th AIAA International Communications Satellite Systems Conference (ICSSC-2010), Aug. 30-Sep. 2, 2010, 10 pgs.

Kolawole, "Satellite Communication Engineering", Second Edition, CRC Press, ISBN 9781138075351, Nov. 23, 2013, pp. 49-59.

Lee et al., "Optimal Beamforming Schemes and its Capacity Behavior for Downlink Distributed Antenna Systems", IEEE Transactions on Wireless Communications vol. 12, No. 6, Jun. 2013, pp. 2578-2587.

Liang et al., "Cooperative Amplify-and-Forward Beamforming with Multiple Multi-Antenna Relays", IEEE Transactions on Communications, vol. 59, No. 9, Sep. 2011, pp. 2605-2615.

Madhow et al., "Distributed massive MIMO: algorithms, architectures and concept systems", Information Theory and Applications Workshop (ITA), IEEE, Feb. 9-14, 2014, 7 pgs.

Madhow, "Distributed Massive MIMO", 2014 Information Theory and Applications Workshop, Feb. 9-14, 2014, Catamaran Resort, San Diego, 29 pgs.

M.K., "A Novel Beamforming and Combining Scheme for Two-Way AF Satellite Systems", IEEE Transactions on Vehicular Technology, vol. 66, No. 2, Feb. 2017, pp. 1248-1256.

Montesinos et al., "Adaptive beamforming for large arrays in satellite communications systems with dispersed coverage", IET Communications, vol. 5, No. 3, Feb. 11, 2011, pp. 350-361.

Mudumbai et al., "Distributed Transmit Beamforming: Challenges and Recent Progress", IEEE Communications Magazine, vol. 47, No. 2, Feb. 2009, pp. 102-110.

Ramanujam et al., "Recent Developments on Multi-beam Antennas At Boeing", 8th European Conference on Antennas and Propagation (EuCAP), Apr. 6-11, 2014, pp. 405-409.

Satcom Guru, "Beam Hopping, Beam Forming, Frequency Reuse, and the Quest for Maximizing Satellite. Throughput", http://www.satcom.guru/2016/02/beamhoppingbeamformingfreguency.html, Feb. 28, 2016, 4 pgs.

Shao et al., "Uplink Ground-based Beamforming with Multiplex on Feeder Link and Fast Adaptive Algorithm for Weights Optimization", IEEE 4th Asia-Pacific Conference on Antennas and Propagation (APCAP), 2015, pp. 570-574.

Sharma et al., "Cognitive Beamhopping for Spectral Coexistence of Multibeam Satellites", Future Network and MobileSummit 2013 Conference Proceedings, Poster Paper, ISBN: 978-1-905824-37-3, 10 pgs.

Shi et al., "Extendable Carrier Synchronization for Distributed Beamforming in Wireless Sensor Networks", International Wireless Communications and Mobile Computing Conference, Sep. 5-9, 2016, 6 pgs.

Spilker, "Digital Communications by Satellite", Prentice-Hall, Inc., Englewood Cliffs, N.J., 1977, 15 pgs.

Thibault et al., "Random, Deterministic, and Hybrid Algorithms for Distributed Beamforming", Proc. 5th Advanced Satellite and Multimedia Systems Conference and 11th Signal Processing for Space Communications Workshop, Sep. 13-15, 2010, pp. 1-40.

Thibault et al., "Phase Synchronization Algorithms for Distributed Beamforming with Time Varying Channels in Wireless Sensor Networks", 7th International Wireless Communications and Mobile Computing Conference, Jul. 4-8, 2011, pp. 77-82.

Thibault et al., "Coarse Beamforming Techniques for Multi-Beam Satellite Networks", IEEE International Conference on Communications, Jun. 10-15, 2012, pp. 3270-3274.

Thibault, "Advanced Beamforming for Distributed and Multi-Beam Networks", Doctoral Dissertation Thesis, 2013, 175 pgs.

Thibault et al., "Design and Analysis of Deterministic Distributed Beamforming Algorithms in the Presence of Noise", IEEE Transactions on Communications, vol. 61, No. 4, Apr. 2013, pp. 1595-1607.

Vasavada et al., "Architectures for next generation high throughput satellite systems", Int. J. Satell. Commun. Network, 2016, 24 pgs.

Vazquez et al., "Hybrid Analog-Digital Transmit Beamforming for Spectrum Sharing Satellite-Terrestrial Systems", IEEE, 17th International Workshop on Signal Processing Advances in Wireless Communications, Jul. 3-6, 2016, 5 pgs.

(56) References Cited

OTHER PUBLICATIONS

Vouyioukas, "A Survey on Beamforming Techniques for Wireless MIMO Relay Networks", International Journal of Antennas and Propagation, 2013, 22 pgs.
Walker et al., "Architecture, Implementation and Performance of Ground-Based Beam Forming in the DBSD G1 Mobile Satellite System", 28th AIAA International Communications Satellite Systems Conference (ICSSC-2010), Aug. 30-Sep. 2, 2010, 29 pgs.
Yan et al., "Joint Beamforming and Jamming Design for Secure Cooperative Hybrid Satellite-Terrestrial Relay Network", 25th Wireless and Optical Communication Conference (WOCC), May 21-23, 2016, 5 pgs.
Yanez et al., "Hybrid Space-Ground Processing for High Capacity Multi-beam Satellite Systems", Global Telecommunications Conference (GLOBECOM 2011), IEEE, Dec. 2011, 6 pgs.
Yu et al., "Virtual Multi-beamforming for Distributed Satellite Clusters in Space Information Networks", IEEE Wireless Communications, vol. 23, No. 1, Feb. 2016, pp. 95-101.
Zheng et al., "Adaptive Beam-Forming with Interference Suppression and Multi-User Detection in Satellite Systems with Terrestrial Reuse of Frequencies", IEEE Vehicular Technology Conference, vol. 62, No. 4, 2005, pp. 1-5.
International Search Report and Written Opinion mailed in International (PCT) Application No. PCT/US2016/026813 dated Jan. 16, 2017, 10 pgs.
International Preliminary Report on Patentability mailed in International (PCT) Application No. PCT/US2016/026813 dated Oct. 10, 2017, 8 pgs.
International Search Report and Written Opinion mailed in International (PCT) Application No. PCT/US2016/026815 dated Jan. 16, 2017, 10 pgs.
International Preliminary Report on Patentability mailed in International (PCT) Application No. PCT/US2016/026815 dated Oct. 10, 2017, 8 pgs.
International Search Report and Written Opinion mailed in International (PCT) Application No. PCT/US2017/057723 dated Jan. 30, 2018, 13 pgs.
International Preliminary Report on Patentability mailed in International (PCT) Application No. PCT/US2017/057723 dated Feb. 1, 2019, 32 pgs.
Examination Report mailed in European Patent Application No. 16781585.1 dated May 3, 2019, 5 pgs.
Search Report and Written Opinion mailed in Singapore Patent Application No. 11201708179X dated Jul. 30, 2018, 12 pgs.
First Examination Report in Related Chilean Application No. 201901032, dated Feb. 19, 2020.

\* cited by examiner

GROUND-BASED BEAMFORMED COMMUNICATIONS USING MUTUALLY SYNCHRONIZED SPATIALLY MULTIPLEXED FEEDER LINKS

CROSS-REFERENCE TO RELATED APPLICATIONS

The present application is a continuation of International Application No. PCT/US17/57723, filed on Oct. 20, 2017, which claims the benefit of priority to U.S. Provisional Application No. 62/411,377, filed on Oct. 21, 2016, the entire contents of each of which are incorporated by reference herein for all purposes.

FIELD

Embodiments relate generally to communications systems, and, more particularly, to providing ground-based beamforming with mutually synchronized, spatially multiplexed feeder links.

BACKGROUND

In wireless communications systems, such as satellite communication systems, data can be communicated from one location to another via a wireless relay. For example, in a satellite communications system, data can be communicated between gateways and user terminals via a satellite. It is generally desirable to increase capacity of the communications system. Some approaches for increasing capacity involve increasing power, but such approaches can have various limitations. For example, power increases can be limited by power budgets (e.g., practical power limitations of system components, etc.) and/or by regulatory constraints (e.g., maximum allowed transmission power, etc.), and increases in power can have a disproportionately small impact on capacity (e.g., following a logarithmic gain when operating near the Shannon limit). Some other approaches involve increasing bandwidth (e.g., via greater frequency reuse, since spectrum allocations are typically fixed and limited). However, increasing bandwidth reuse typically involves increasing the number of beams servicing ground terminals and decreasing beam sizes. Decreased beam sizes present a number of challenges, such as increased size, weight, complexity, cost, etc. of the satellite and/or ground terminals; increased accuracy required for antenna pointing and attitude control in the satellite; etc. Small beam sizes also present challenges with respect to matching the provided system capacity (e.g., providing an equal share to each of the beams) to demand (often very unevenly distributed over the user coverage area).

Some of these concerns can be addressed for certain applications using techniques such as on-board beamforming arrays and hardware, but such techniques can further increase the size, weight, cost, and complexity of the satellite. One approach to reducing the complexity on board the satellite, while maintaining certain features of on-board beamforming, is to shift the complexity to the ground. So-called "ground-based beamforming" (GBBF) approaches can be effective, but implementations have tended to focus on lower bandwidth contexts (e.g., providing a few MHz of user link bandwidth for L-band carrier frequencies). Conventional GBBF has a feeder bandwidth expansion problem, as the required feeder link bandwidth is a multiple of the user link bandwidth, the multiplication factor being related to the number of antenna elements provided by the user link array. So for example, to provide 1 GHz of user bandwidth (e.g., at Ka-band) with a 100-element user-link beamforming array may require 100 GHz of feeder link bandwidth. The bandwidth expansion problem can frustrate practical application of conventional GBBF to high-capacity satellite systems.

BRIEF SUMMARY

Among other things, systems and methods are described for providing ground-based beamforming with mutually synchronized, spatially multiplexed gateways in a wireless communications system. Some embodiments operate in the context of a satellite communications system having a number of geographically distributed gateway terminals in communication with a large number of user terminals via a satellite. The satellite can include a focused-beam feeder antenna that communicates with the geographically distributed gateway terminals (e.g., single gateway per beam), and a user antenna that services user terminals in multiple coverage areas with formed user beams. The gateway terminals can communicate forward signals that are beam-weighted and mutually phase-synchronized (e.g., according to satellite and/or loopback beacons), such that the forward uplink signals received by the satellite are phase-coherent. The beam weighting is such that the signals relayed (e.g., transmitted) by the satellite spatially combine to form the user beams. Embodiments can achieve extensive frequency reuse through spatial multiplexing of the feeder-link signals. For example, some implementations use very narrow feeder beams (e.g., with large satellite antenna aperture) with frequency reuse of the same band to achieve spatial multiplexing. Some implementations further increase capacity of the communications system and/or further reduce the number of gateways by exploiting multiple poles per gateway, multiple frequency sub-ranges per gateway, and/or other techniques.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Embodiments described herein include novel techniques for providing ground-based beamforming with mutually synchronized spatially multiplexed gateways in a wireless communications system (referred to herein as mutually synchronized spatially multiplexed feeder links, or MSSMFL). Some such techniques include mutually phase-synchronizing and beam-weighting spatially multiplexed feeder-link signals in the ground segment of the communications system. For example, in the forward direction, focused feeder beams can be used to receive the mutually phase-synchronized and beam-weighted, spatially multiplexed forward uplink signals at a satellite (e.g., or any other suitable wireless communications relay). The satellite can use an antenna array to relay the mutually phase-synchronized signals in such a way that forms user beams according to the beam-weighting of the signals. Because the feeder beams are focused, they can be directed to different (spatially-separated) regions, allowing feeder links to reuse the same frequency band. This resulting frequency reuse thus avoids the bandwidth expansion problem of conventional ground-based beamforming. Accordingly, novel types of ground-based beamforming with MSSMFL described herein can facilitate implementation of high-throughput satellite communications systems, such as systems providing throughputs of 1 Terabit-per-second or more.

Figure 1:
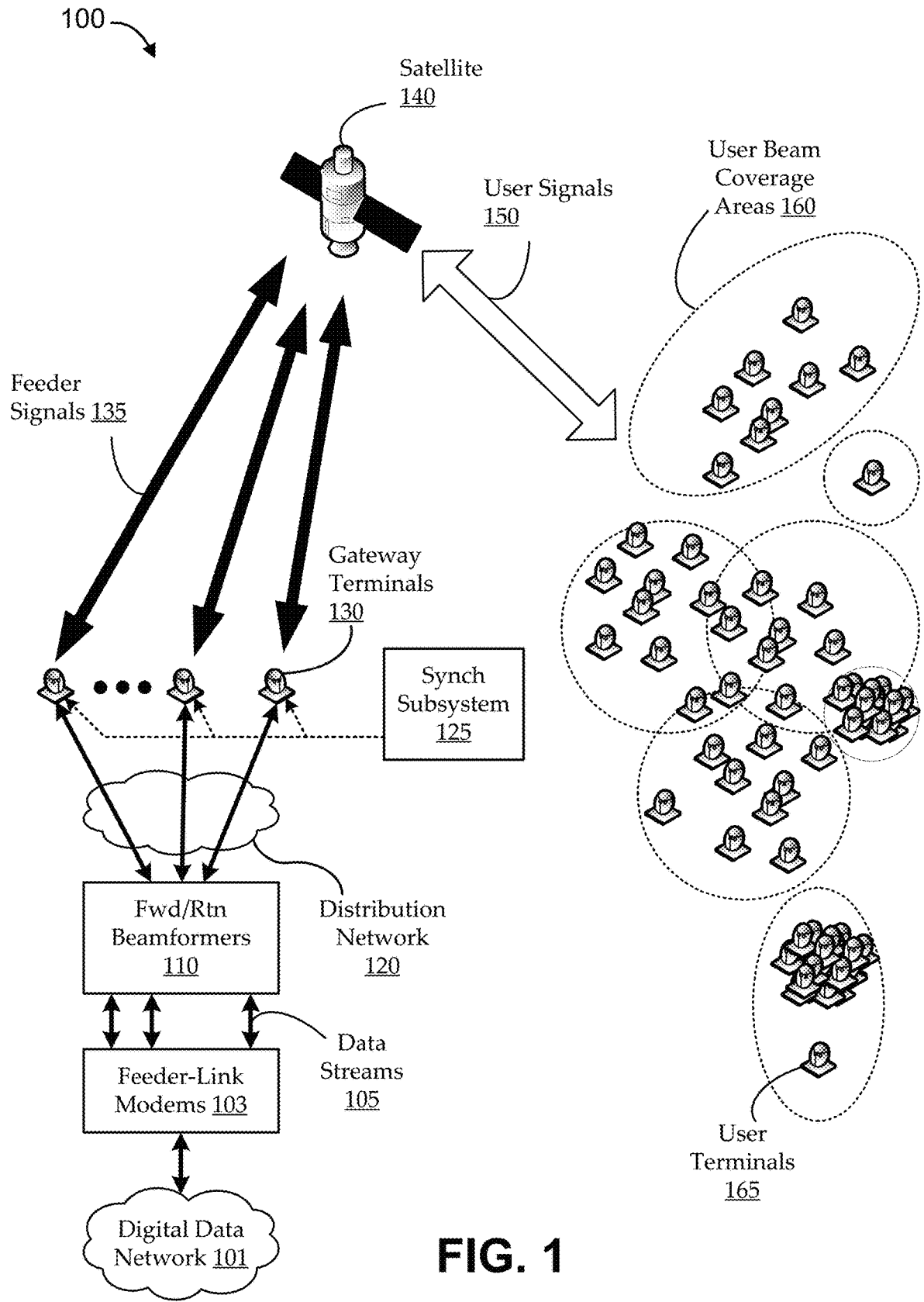
FIG. 1 shows an illustrative satellite communications system for providing ground-based beamforming using mutually synchronized spatially multiplexed feeder links (MSSMFL), according to various embodiments.

Turning to FIG. 1, an illustrative satellite communications system 100 is shown for providing MSSMFL, according to various embodiments. As illustrated, the satellite communications system 100 includes a satellite 140 in communications with multiple (M) gateway terminals 130 and multiple user terminals 165. The satellite 140 can be implemented as a bent-pipe (e.g., non-processed) geosynchronous (GEO) communications satellite. Alternatively, the satellite 140 can be implemented as any other suitable satellite or wireless communications relay as described herein. The gateway terminals 130 are geographically distributed and communicate with the satellite via focused feeder beams. For example, the gateway terminals 130 are disposed in at least two feeder beams without overlapping with each other (e.g., as single spot beam per gateway terminals 130, or any other suitable implementation). All M gateway terminals 130 operate at a same carrier frequency. Note, however, that for gateways that are mutually-synchronized as described herein, there may be brief periods of time during which the gateways do not operate at exactly the same carrier frequency due to tolerances, cycle slips, phase/frequency noise, and short terms loss of synchronization. Moreover, a gateway may transmit multiple carriers simultaneously each at a different frequency. However, for transmission of multiple carriers, any individual carrier which is beamformed by the satellite will be transmitted at the same frequency by each gateway. Thus, gateways may be said to transmit at substantially the same frequency without altering the scope of the present invention. The user terminals 165 are disposed in one or more user beam coverage areas 160 associated with one or more formed user beams (e.g., using beamforming antenna elements on the satellite 140).

The gateway terminals 130 are in communication with other ground segment components, which can enable MSSMFL through ground-based coordination of phase-synchronized feeder-link signals and beamformed user-link signals. As illustrated, feeder-link modems 103 can be in communication with a digital data network 101, such as the Internet, or the like. The feeder-link modems 103 can convert between digital data network 101 traffic and data streams 105 associated with user beam coverage areas 160. For example, K data streams 105 can be associated with traffic to and from K user beam coverage areas 160 (corresponding to K formed user beams).

The feeder-link modems 103 can be coupled with forward and/or return beamformers 110, and the forward and/or return beamformers 110 can be in communication with the gateway terminals 130. For example, each gateway terminal 130 includes a communications link with the forward and/or return beamformers 110 via a distribution network 120, such as an Internet backhaul network, or any other suitable network. Embodiments of the forward and/or return beamformers 110 can apply forward and/or return beam weights to forward and/or return signals, respectively. For example, in the forward direction, the forward and/or return beamformers 110 can generate beam-weighted forward signals from the K data streams 105, which can be communicated to the gateway terminals 130. In the return direction, the forward and/or return beamformers 110 can generate the K data streams 105 from return signals received from the gateway terminals 130.

In some implementations, the beamforming of user beams by the forward and/or return beamformers 110 is adaptive. For example, feedback is used to adaptively compute the forward and/or return beam weights over time, thereby adapting the user beam beamforming to the feedback. Such adaptation can tend to compensate for various types of non-idealities, such as changes in satellite attitude, changes in satellite reflectors (e.g., flexing, etc.), and/or other sources of beam pointing error. In certain implementations, the user beam beamforming is non-adaptive. For example, where satellite attitude is well-controlled, and spatial distribution of desired user beams is known, pre-calculated beamweights can be applied by the forward and/or return beamformers 110 to form the desired user beams. Some such implementations can be fully non-adaptive, while other such implementations can be partially adaptive (e.g., some adaptive loops can be used to address certain non-idealities, as desired). In various implementations, adaptive and non-adaptive beamforming can be used to support fixed or dynamic user beam generation (e.g., fixed or dynamic user beam sizes, user beam locations, and/or other user beam characteristics). For example, an adaptive fixed approach can use adaptive beamforming to maintain user beam locations in context of changing satellite attitude, while using fixed beam locations. An adaptive dynamic approach can also change beam sizes and/or locations in response to changes in traffic demand, and a non-adaptive dynamic approach can cycle through pre-computed beam weights in different time slots to generate user beams of different sizes and/or locations.

The gateway terminals 130 are also in communication with a synchronization subsystem 125. Embodiments of the synchronization subsystem 125 can mutually phase-synchronize uplink signals from the gateway terminals 130 so that the uplink signals will be received by the satellite 140 in a phase-synchronous manner. For example, the synchronization subsystem 125 can synchronize the carrier phase of the uplink signals from each gateway terminal 130 to account for path delay differences between each gateway terminal 130 and the satellite 140 (e.g., the geographic distribution of the gateway terminals 130 yields different distances between each gateway terminal 130 and the satellite). Some embodiments can further time-synchronize the signals, for example, to line up symbol boundaries among transmissions from the different gateway terminals 130. For example, this can help support dynamic changes to modulation and/or encoding of data streams (e.g., changes in modcodes), which can affect symbol durations and/or other parameters.

The synchronization subsystem 125 can be implemented in any suitable manner. In some implementations, each gateway terminal 130 includes, or is coupled with, a local instance of the synchronization subsystem 125. In other implementations, some or all gateway terminals 130 can share an instance (e.g., a single, centralized instance) of the synchronization subsystem 125. For example, the shared synchronization subsystem 125 can synchronize itself (or a single gateway terminal 130) with the satellite 140, and can further synchronize the multiple other sharing gateway terminals 130, accordingly. As described more fully below, various techniques can be used to perform various types of synchronization with the synchronization subsystem 125. For example, the satellite 140 can transmit a beacon signal that can be received by the synchronization subsystem 125 (via some or all gateway terminals 130); and the synchronization subsystem 125 (e.g., each instance of the synchronization subsystem 125 at each gateway terminal 130) can transmit a loopback beacon signal. The synchronization subsystem 125 can synchronize the satellite beacon and the loopback beacons to enable mutual phase-synchronization of the feeder-link signals.

Figure 2:
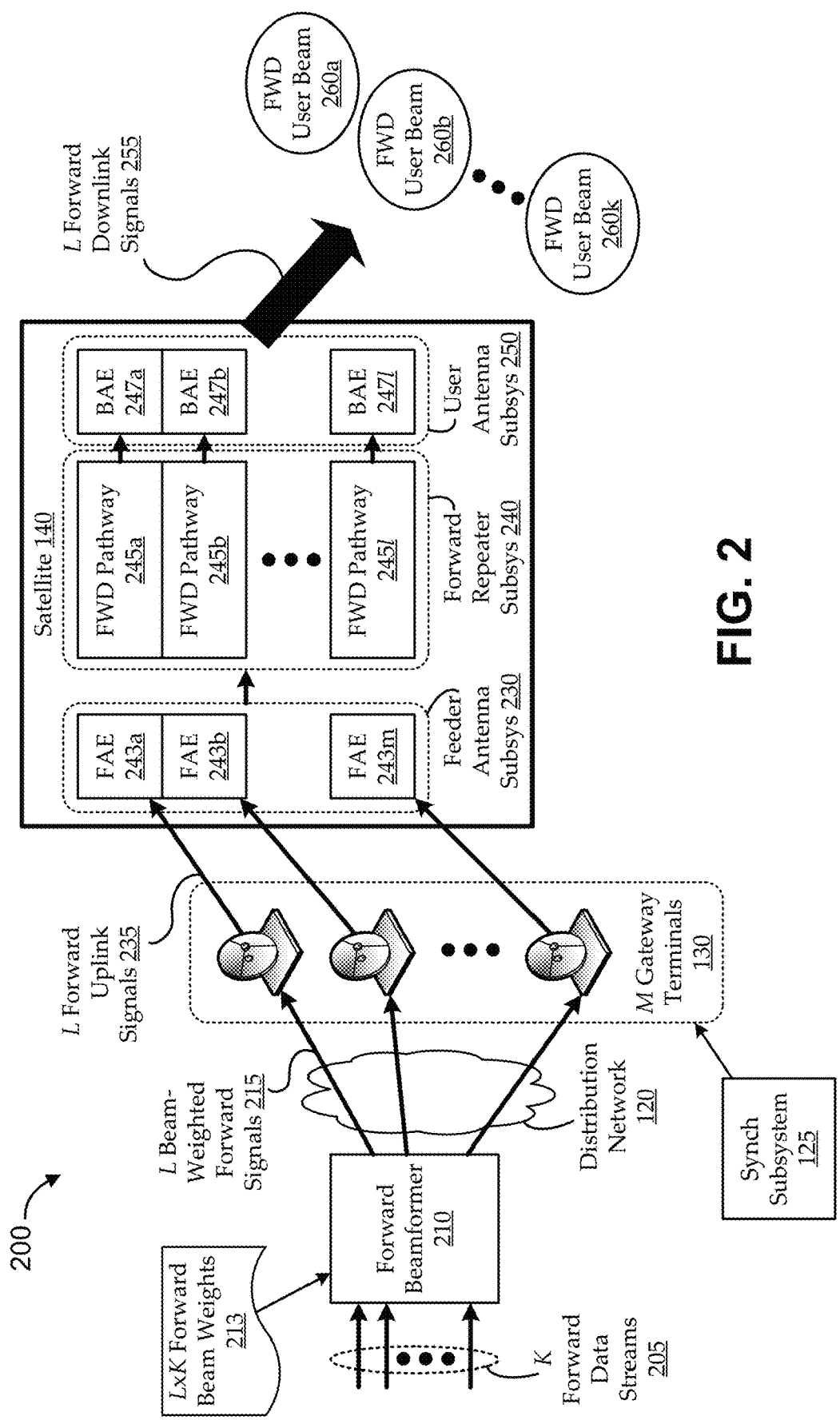
FIG. 2 shows an illustrative satellite communications system for implementing forward-link communications, according to various embodiments.

FIG. 2 shows an illustrative satellite communications system 200 for implementing forward-link communications, according to various embodiments. The satellite communications system 200 can be an implementation of the satellite communications system 100 described with reference to FIG. 1. As illustrated, the satellite 140 provides communications between a number (M) of geographically distributed gateway terminals 130 and a number of user terminals 165 in at least one user beam coverage area (corresponding to forward user beams 260). The satellite 140 includes a feeder antenna subsystem 230 and a user antenna subsystem 250. The feeder antenna subsystem 230 includes a number of focused-beam antenna elements (FAEs) 243, each illuminating a respective focused feeder beam. The feeder-link can operate with a single gateway per beam, a group of gateways per beam, and/or in any other suitable manner that enables bandwidth reuse through spatial multiplexing. Further, a single beam can be implemented using multiple antenna elements in some cases. The user antenna subsystem 250 includes an array of beamforming antenna elements (BAEs) 247 that can form one or more user beams (e.g., forward user beams 260) for communicating with user terminals 165 disposed in the coverage areas of those user beams. Note that, because the system is a ground-based beamforming system, no phasing components need be included in the BAEs, as the phasing of signals transmitted by the BAEs is controlled by the phase relationships of the signals received by the corresponding FAEs as explained further below. The feeder antenna subsystem 230 and the user antenna subsystem 250 can be implemented in various ways. In one implementation, the feeder antenna subsystem 230 and/or the user antenna subsystem 250 is implemented as a direct radiating array (e.g., the user antenna subsystem 250 can include a two-meter direct radiating array). In another implementation, the feeder antenna subsystem 230 and/or the user antenna subsystem 250 is implemented with separate transmit and receive antennas. Some implementations also include one or more reflectors (e.g., an array fed reflector). One such implementation includes a single reflector positioned, so that feeder feeds of the feeder antenna subsystem 230 are in focus with respect to the reflector, and user feeds of the user antenna subsystem 250 are out of focus with respect to the reflector. Another such implementation includes separate user and feeder reflectors, for example, implemented so that feeder feeds of the feeder antenna subsystem 230 are in focus with respect to the feeder reflector, and user feeds of the user antenna subsystem 250 are out of focus with respect to the user. In one implementation, the one or more reflectors are be implemented as di-chroic reflectors. For example, the di-chroic reflector(s) can include a sub-reflector that affects only uplink signals, while higher-frequency downlink signals pass through the surface of the sub-reflector.

The satellite further includes a forward repeater subsystem 240 having a number (L) of forward-link pathways 245, where L equals the number of gateway terminals 130 (M) (although, as explained below, in some embodiments, M can be less than L). There are many ways that the feeder antenna system 230 may be connected to the forward repeater subsystem 240. For example, in a case where the number of gateway terminals 130 (M) is equal to the number of FAEs 243 (L), each FAE 243 can include one forward-link output, each coupled with an input side of a respective one of the forward-link pathways 245. Each BAE 247 can include a forward-link input coupled with an output side of a respective one of the forward-link pathways 245. In some cases, one or more FAEs 243 can include multiple forward-link outputs, each coupled with an input side of a respective one of the forward-link pathways 245. The forward repeater subsystem 240 can have a forward uplink frequency range and a forward downlink frequency range. In some cases, the forward uplink frequency range overlaps (e.g., is partly or completely coextensive with) the return uplink frequency range, and the forward downlink frequency range overlaps the return downlink frequency range (e.g., feeder and user uplinks share a first frequency band and/or range, and feeder and user downlinks share a second frequency band and/or range). For example, forward uplink signals can be received by a FAE 243 at the forward uplink frequency range, converted by the coupled forward-link pathway 245 to the forward downlink frequency range, and transmitted by the coupled BAE 247. As described below, this can enable forward downlink signals to be generable from beam-weighted, mutually phase-synchronized forward uplink signals that are each received at a respective one of the forward-link FAE inputs from a corresponding one of the geographically distributed gateway terminals 130, such that transmission of the forward downlink signals by the forward-link BAE outputs causes the forward downlink signals to spatially superpose to form the at least one forward user beam 260.

As illustrated, each of K forward data streams 205 (e.g., from feeder-link modems, or the like) includes data destined for a respective one of the K forward user beams 260. In general, it is desired to distribute a beamformed version of those forward data streams 205 to some or all of the M spatially separated gateway terminals 130. In this way, the gateway terminals 130 can provide spatial multiplexing and bandwidth reuse for the forward communications. The forward data streams 205 can be received by a forward beamformer 210 (e.g., part of the forward/return beamformers 110 of FIG. 1). The forward beamformer 210 can apply L×K forward beam weights 213 to the forward data streams 205 to generate L beam-weighted forward signals 215. For example, the forward beamformer 210 includes a forward data stream input, a beam weight input indicating a beam weight 213 associated with each of the gateway terminals 130; and beam-weighted forward signal outputs. Each beam-weighted forward signal output can be coupled with the beam-weighted forward signal input of a respective one of the gateway terminals 130 via the distribution network 120, and each can be a version of the forward data stream input that has been beam-weighted according to the beam weight 213 associated with the respective one of the gateway terminals 130. Each of the L beam-weighted forward signals 215 is generated to correspond to a respective one of the L forward-link pathways 245 (and, accordingly, to a respective one of the L BAEs 247). The forward beam weights 213 are computed so that, when the weighted signals are ultimately transmitted from the user antenna subsystem 250, the signals will spatially combine to form the forward user beams 260.

The forward beam weights 213 can be computed and applied in any suitable manner. In some cases, the forward beam weights 213 are stored in a forward beam weight store of the forward beamformer 210. In other cases, a beam weight generator is part of, or coupled with, the forward beamformer 210. The forward beam weights 213 can be pre-computed, prior to deploying the satellite 140, based on simulated communication link characteristics; computed one or more times (e.g., periodically) based on feedback and analysis of the operating satellite communications system 200; adjusted adaptively based on feedback and analysis of the operating satellite communications system 200; and/or computed in any other suitable manner. Many techniques are known for generating the forward beamforming coefficients.

For example, the coefficients for multiple beams can be globally optimized to maximize the sum of the signal to interference and noise ratios for all the beams. For example, at low signal to noise ratio, the weights may be chosen to maximize signal power, while at high signal to noise ratio, the weights may be selected to minimize the intra beam interference.

Each of the L beam-weighted forward signals 215 can be communicated (e.g., via the distribution network 120) to a respective one of the M gateway terminals 130. In many cases, the number of gateways terminals 130 (M) is exactly the same as the number of forward link pathways 245 (L). As will be discussed later, L may be greater than or equal to M, so that each of the M gateway terminals 130 may receive one or more of the L beam-weighted forward signals 215 (corresponding to the one or more forward-link pathways 245 coupled with each FAE 243, each FAE 243 being associated with a respective gateway terminal 130). Accordingly, the M gateway terminals 130 can transmit the beam-weighted forward signals 215 to the satellite 140 as L forward uplink signals 235. Prior to transmitting the forward uplink signals 235, the signals are mutually phase-synchronized. As described above, the gateway terminals 130 include, or are in communication with, a synchronization subsystem 125 that can mutually phase-synchronize the beam-weighted forward signals 215 to generate the forward uplink signals 235. The mutual phase-synchronization causes the gateway terminals 130 to transmit the beam-weighted forward signals 215 to the satellite 140 in such a way that the forward uplink signals 235 are received in a phase-synchronous manner by the FAEs 243 of the feeder antenna subsystem 230. For example, the synchronization accounts for path delay differences between each gateway terminal 130 and the satellite 140, so that the signals received by the FAEs 243 have their carrier phases lined up and are at least approximately time-synchronized (e.g., to within a fraction of a desired communication signal symbol period).

Thus, the satellite 140 receives multiple (L) beam-weighted, mutually synchronized forward uplink signals 235, each via a focused feeder uplink (e.g., corresponding to one of the M gateway terminal 130 locations). The satellite 140 can generate each of multiple beam-weighted, mutually synchronized forward downlink signals 255 from a corresponding one of the plurality of forward uplink signals 235. The satellite 140 can transmit the forward downlink signals 255 via de-focused user downlinks, such that the forward downlink signals 255 spatially superpose to form the one or more forward user beams 260. For example, each forward uplink signal 235 can be received by one of the FAEs 243 and passed to a coupled one of the forward-link pathways 245, which can generate a respective one of the forward downlink signals 255 therefrom (e.g., by amplifying and frequency-converting the forward uplink signals 235). Each forward downlink signal 255 can be passed to a coupled one of the BAEs 247 of the user antenna subsystem 250. The BAEs 247 can transmit the forward downlink signals 255, and the beam weighting (e.g., and mutual synchronization) of the forward downlink signals 255 causes them to spatially combine to form the forward user beams 260. Each of the L BAEs 247 effectively transmits to each of K user beam coverage areas, so that L forward downlink signals 255 can spatially combine at each of the K user beam coverage areas to form a respective one of the K forward user beams 260.

Figure 3:
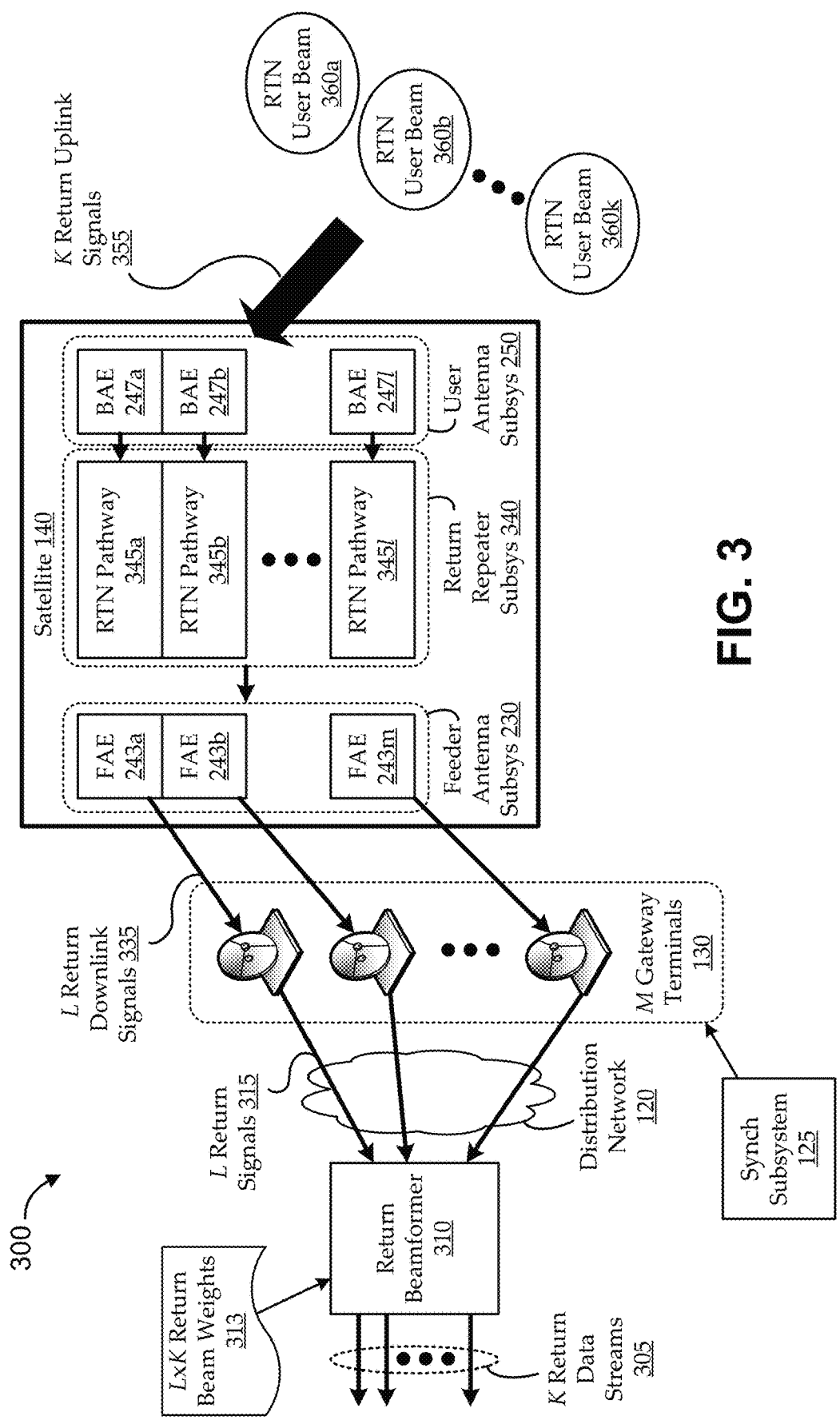
FIG. 3 shows an illustrative satellite communications system for implementing return-link communications, according to various embodiments.

FIG. 3 shows an illustrative satellite communications system 300 for implementing return-link communications, according to various embodiments. For the sake of clarity, the satellite communications system 300 is illustrated to correspond to the satellite communications systems 200 described with reference to FIG. 2, and components are labeled with similar or identical reference designators. As described above, the satellite 140 provides communications between a number of user terminals 165 in K user beam coverage area (corresponding to return user beams 360) and M geographically distributed gateway terminals 130. Some embodiments can use the same feeder antenna subsystem 230 and user antenna subsystem 250 in both the forward and return directions. For example, in the return direction, return uplink signals 355 can be received by the BAEs 247 of the user antenna subsystem 250 (from user terminals 165 in some or all of the return user beams 360). A return repeater subsystem 340, having return-link pathways 345 coupled with return-link outputs of the BAEs 247, can generate return downlink signals 335 from the return uplink signals 355. FAEs 243 of the feeder antenna subsystem 230, each having one or more return-link inputs coupled with respective ones of the return-link pathways 345, can transmit the return downlink signals 335 to respective ones of the gateway terminals 130.

In some embodiments K return uplink signals 355 are received by each of the L BAEs 247. Each of the L BAEs 247 is coupled with a respective one of L return-link pathways 345, so that L return downlink signals 335 are generated, each potentially including information transmitted from the K return user beams 360. There are many ways that the return repeater subsystem may be connected to the feeder antenna subsystem. For example, in a case where the number of gateway terminals 130 (M) is equal to the number of FAEs 243 (L), each FAE 243 can include one return-link input, each coupled with an output side of a respective one of the return-link pathways 345. In some cases, one or more FAEs 243 can include multiple return-link inputs, each coupled with an output side of a respective one of the return-link pathways 345 (e.g., as described in further detail below, in reference to FIG. 10). Thus, each of M FAEs 243 is coupled with one or more of the L return-link pathways 345, so that the L return downlink signals 335 are transmitted to the M gateway terminals 130. The received return downlink signals 335 are neither beam-weighted nor mutually synchronized. The synchronization subsystem 125 can mutually synchronize the return downlink signals 335 (e.g., line up carrier phase, carrier timing, symbol boundaries, etc.) to generate L return signals 315 that are communicated to a return beamformer 310 (e.g., either before or after transport via the distribution network 120). The return signals 315 can be mutually synchronized from the perspective of the return beamformer 310. For example, in some embodiments, the satellite 140 can transmit a beacon signal (e.g., a shared beacon) which is received by each gateway terminal 130 and used to mutually phase-synchronize the return downlink signals 335 at the gateways 130 relative to the beacon. The return beamformer 310 can apply L×K return beam weights 313 to the return signals 315 in such a way as to form the return user beams 360 (e.g., applying the return beam weights 313 recovers the K return uplink signals via K retroactively formed return user beams 360). The return beam weights 313 can be computed and/or applied in any suitable manner, for example, as described above with reference to computing and applying the forward beam weights 213 in FIG. 2. In the return direction, however, intrabeam interference is generated by the transmitting terminals, not by the beamforming process. Each beam's beamforming weights can thus be optimized individually. By applying the L×K return beam weights 313 to the synchronized L return signals 315, the return beamformer 310 can generate K return data streams 305. In some embodiments, the return data streams 305 can be demodulated by feeder-link modems, or the like, for communication via a digital data network, such as the Internet.

Figure 4:
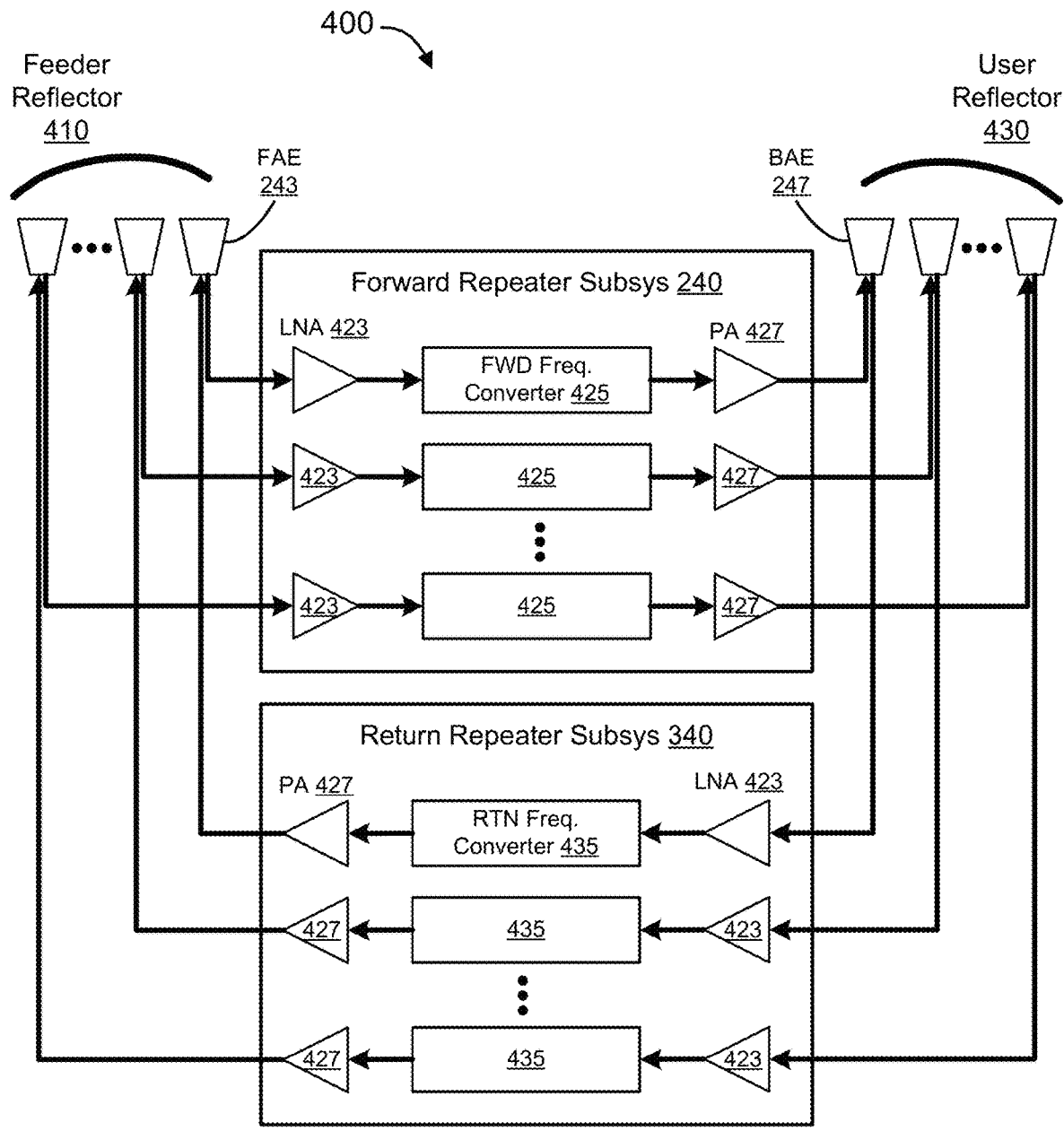
FIG. 4 shows a block diagram of an illustrative satellite system for providing MSSMFL, according to various embodiments.

FIG. 4 shows a block diagram of a portion of an illustrative satellite system 400 for providing MSSMFL, according to various embodiments. The satellite system 400 includes multiple FAEs 243, each having a forward-link input and a return link output, which can collectively be referred to as the feeder antenna subsystem. In some embodiments, the feeder antenna system can also include one or more feeder reflectors 410. For example, the feeder reflector(s) 410 can be used in conjunction with the FAEs 243 to focus feeder beams by which to communicate with gateway terminal locations. In some embodiments, the FAEs 243 are implemented as a single feed per beam (SFPB) architecture. According to such an architecture, the FAEs 243 include antenna feeds, and each antenna feed corresponds to a single respective one of the feeder beams. Some implementations include large numbers of feeder beams, such that using a SFPB architecture involves a comparably large number of antenna feeds. Physical size limitations of the antenna feeds can limit the physical density of the antenna feeds (i.e., how closely the feeds can be placed in the feeder antenna subsystem, which can effectively limit the number of gateway beams that can be supported by a SFPB architecture. In other embodiments, the FAEs 243 are implemented as a multiple feeds per beam (MFPB) architecture. According to such an architecture, each antenna feed can be coupled with a weighted set of beam signals, so that each antenna feed can effectively be shared across multiple feeder beams (e.g., in clusters of three antenna feeds, seven antenna feeds, etc.).

The satellite system 400 also includes multiple BAEs 247, each having a forward-link output and a return link input, which can collectively be referred to as the user antenna subsystem. In some embodiments, the user antenna system can also include one or more user reflectors 430. For example, the user reflector(s) 430 can be used in conjunction with the BAEs 247 to form forward and return user beams associated with user beam coverage areas as described herein. In some embodiments, a single reflector may be used as both a user reflector 430 and a feeder reflector 410. In some embodiments, the user antenna subsystem can be the same as the feeder antenna subsystem.

The satellite system 400 can further include a forward repeater subsystem 240 and a return repeater subsystem 340. The forward repeater subsystem 240 can have a forward uplink frequency range and a forward downlink frequency range and a number of forward-link pathways, each coupled between one of the forward-link inputs and one of the forward-link outputs. As illustrated, each forward-link input of a FAE 243 can be coupled with a low-noise amplifier (LNA) 423 operating at the forward uplink frequency range. Each LNA 423 can be coupled with an input side of a forward frequency converter 425, which can convert the received, amplified forward uplink signal from the forward uplink frequency range to the forward downlink frequency range. An output side of each forward frequency converter 425 can be coupled with a power amplifier (PA) 427 operating at the forward downlink frequency range. Each PA 427 can be coupled with the forward-link output of a respective one of the BAEs 247. Each coupled LNA 423, forward frequency converter 425, and PA 427 can collectively implement a forward-link pathway (e.g., one of the forward-link pathways 245 of FIG. 2). As described above, phase-synchronously receiving the mutually phase-synchronized, beam-weighted forward uplink signals (generated as such by feeder-side ground network components) at the FAEs 243 can cause the forward downlink signals also to be phase-synchronized and beam-weighted, such that transmission of the forward downlink signals by the BAEs 247 causes forward user beams to form by spatial superposition of the forward downlink signals.

The return repeater subsystem 340 can have a return uplink frequency range and a return downlink frequency range and a number of return-link pathways, each coupled between one of the return-link inputs and one of the return-link outputs. As illustrated, each return-link input of a BAE 247 can be coupled with an LNA 423 operating at the return uplink frequency range (e.g., which may or may not overlap with the forward uplink frequency range). Each LNA 423 can be coupled with an input side of a return frequency converter 435, which can convert the received, amplified return uplink signal from the return uplink frequency range to the return downlink frequency range. An output side of each return frequency converter 435 can be coupled with a PA 427 operating at the return downlink frequency range. Each PA 427 can be coupled with the return-link output of a respective one of the FAEs 243. Each coupled LNA 423, return frequency converter 435, and PA 427 can collectively implement a return-link pathway (e.g., one of the return-link pathways 345 of FIG. 3). In some cases, the return-link pathways are implemented in substantially the same manner, and with substantially the same components, as the forward-link pathways. For example, the forward-link pathways and the return-link pathways can be bent-pipe pathways; the forward-link pathways and the return-link pathways can be cross-band pathways (i.e., each having an input side at a first frequency band and an output side at a second frequency band); etc. As described above, ground-based beamforming of the return downlink signals received by geographically distributed gateway terminals 135 can effectively cause return user beams to form with respect to the transmitted return uplink signals.

In embodiments that include separate user antenna and feeder antenna subsystems, each antenna subsystem can be configured (e.g., optimized) for certain characteristics. For example, some MSSMFL communications systems can have different user and feeder beam coverage areas, which may or may not overlap; some MSSMFL communications systems can have some or all gateway terminals 130 disposed in user beam coverage areas; while other MSSMFL communications systems can have some or all gateway terminals 130 disposed outside user beam coverage areas; etc. In these and other types of implementations, the feeder and user antenna subsystems (e.g., the reflectors, antenna elements, etc.) can be focused, pointed, and/or otherwise configured to provide communications services to the different coverage areas and/or to provide communications services to coverage areas in different ways. For example, the feeder reflector 410 can be configured with a larger aperture size than that of the user reflector 430 to illuminate the gateway terminals 130 with smaller focused beams. Such a configuration can, for example, facilitate deployment of some or all gateway terminals 130 in a smaller geographic region (e.g., as opposed to distributing the gateway terminals 130 across a larger user beam coverage area), while maintaining sufficient separation for desired bandwidth reuse. For example, gateway terminals 130 located only within the continental United States can be used to service user terminals spread over a larger portion of the Earth's surface (e.g., the approximately one-third of the Earth visible from a geostationary satellite).

Figure 12:
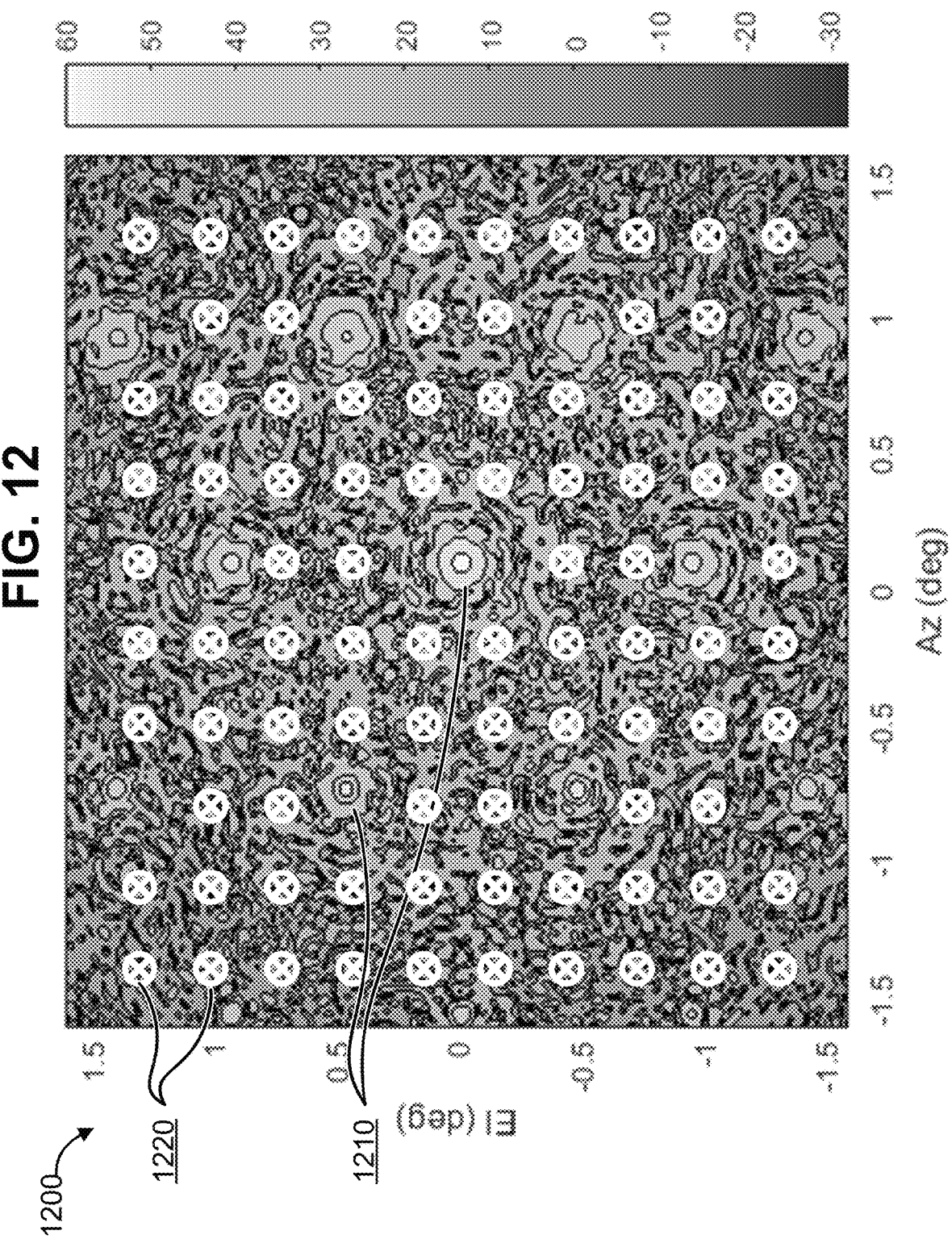
FIG. 12 shows a plot of a feeder-link antenna pattern for an illustrative feeder reflector plotted with respect to azimuth and elevation.

Larger feeder reflectors 410 can tend to have more surface distortion, to be more susceptible to flexing (e.g., due to temperature differentials across the reflector, or the like), and/or to otherwise impact provision of focused feeder beams. For example, a large unfurlable reflector has surface facets and/or ribs arranged as a periodic structure that can create side lobes in the feeder antenna pattern (e.g., similar in appearance to grating lobes). These and/or other impairments in the feeder antenna pattern can cause cross-talk and/or other interference between gateway terminals 130, which can be addressed in various ways. In some implementations, some or all of the gateway terminals 130 are placed in locations that avoid interference between the gateway terminals 130, accounting for patterns of impairment. FIG. 12 shows a plot 1200 of a feeder-link antenna pattern for an illustrative feeder reflector (e.g., feeder reflector 410) plotted with respect to azimuth and elevation. As illustrated, side lobes in the feeder-link antenna pattern caused by surface distortions of the reflector manifest as regions of feeder-link antenna pattern impairment 1210. Embodiments can determine (e.g., estimate, measure, compute, etc.) such impairment, and gateway terminals 130 can be placed in locations 1220 that avoid the regions of antenna pattern impairment 1210.

In other implementations, interference between the gateway terminals 130 due to feeder antenna pattern impairments can be compensated using one or more impairment compensation approaches. According to a first category of approaches, inter-gateway crosstalk is measured and compensated (e.g., canceled) on the ground. Crosstalk can be measured in various ways. One approach uses loopback beacons (described below) to estimate inter-gateway crosstalk. Because each gateway terminal 130 knows the contents of its transmitted loopback beacon signal, each received loopback beacon signal (i.e., the loopback signal received by the transmitting gateway terminal 140 after being received and repeated by the satellite 140) can be compared to the corresponding transmitted loopback signal to detect and measure crosstalk. Such an approach may be particularly effective when most of the distortion is on the uplink, rather than on the downlink.

Another approach uses calibration at the user terminals 165 to measure the crosstalk. To calibrate the feeder downlink side, a user terminal 165 can transmit a probe signal, such that an expected feeder signal in the response is known. Received feeder signals can be compared to the expected feeder signals to measure crosstalk. Such an approach can be particularly effective when adaptation of the return user link is not needed. Multiple user terminals 165 across one or more user coverage areas can be used to measure crosstalk at different locations and/or corresponding to different feeder downlinks. To calibrate the feeder uplink side, one or more user terminals 165 can be used to measure a response when a probe signal is transmitted by a single gateway terminal 130. Such an approach can be particularly effective when adaptation of the forward user link is not needed. Yet another approach is to use calibration hardware on the satellite 140 to measure crosstalk. For the feeder downlink side, a test signal can be injected by the satellite 140 into each FAE (e.g., one at a time), and the gateway terminals 130 can measure crosstalk in the response to the feeder downlink signals. For the feeder uplink side, a probe signal can be transmitted by a gateway terminal 130, and the response at each FAE measure (e.g., one at a time) and the response reported (or looped back) to the gateways. Having measured crosstalk using any of the above or other approaches, some or all of the measured crosstalk can be removed. Equalization and/or cancelation hardware can be used to remove the measured crosstalk. In some embodiments, the equalization and/or cancelation hardware is implemented in the beamformer (e.g., the forward and/or return beamformers 110 of FIG. 1).

Figure 15:
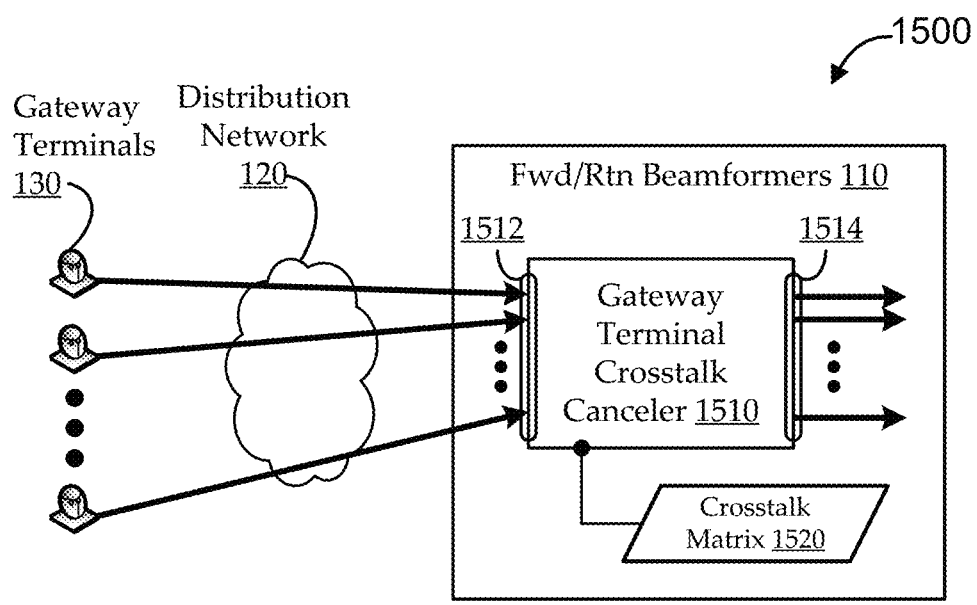
FIG. 15 shows a block diagram of an illustrative feeder antenna pattern impairment compensation environment that includes an illustrative crosstalk canceler.

FIG. 15 shows a block diagram of an illustrative feeder antenna pattern impairment compensation environment 1500 that includes an illustrative crosstalk canceler 1510. The illustrative crosstalk canceler 1510 can be implemented in the beamformer 110 (e.g., coupled to the forward beamformer, return beamformer, or crosstalk cancelers coupled to both). As described above, feeder antenna pattern impairment can cause crosstalk in the feed signals received by the gateway terminals 130 and/or satellite 140. Those feed signals are communicated between the gateway terminals 130 and the forward and/or return beamformers 110 via the distribution network 120 and are received at feed signal input ports 1512 of the crosstalk canceler 1510. Embodiments of the crosstalk canceler 1510 can compensate for the crosstalk and can output compensated feed signals via feed signal output ports 1514. Some implementations of the crosstalk canceler 1510 can receive a crosstalk matrix 1520 (H). The crosstalk matrix 1520 can be a computed (e.g., estimated) feeder matrix. The vector of feed signals with crosstalk can be represented as f, such that $f=H \times f_0$ (where $f_0$ is the vector of the original feed signals without crosstalk, and H is the crosstalk matrix). For example, if H=I (the identity matrix), there is no crosstalk. Accordingly, the cross-talk compensated feed signals can be computed as $\hat{f}=H^{-1} \times f=H^{-1} \times (H \times f_0)=f_0$. Crosstalk compensation can be performed on forward uplink signals 235 (e.g. after forward beamforming), return downlink signals 335 (e.g., before return beamforming), or both. For example, for crosstalk compensation of the forward link, the beam-weighted forward input signals generated by the forward beamformer can be provided to the feed signal input ports 1512, and the cross-talk compensated feed signals at feed signal output ports 1514 can be provided to the gateways as the beam-weighted forward input signals; for crosstalk compensation of the return link, the return signal output from the gateways can be provide to the feed signal input ports 1512, and the cross-talk compensated feed signals at feed signal output ports 1514 can be provided to the return beamformer as the return signal outputs. Alternatively, the order of crosstalk compensation and beamforming can be reversed.

Another category of approaches to impairment compensation involves limited beamforming. As described herein, feeder beams are produced using focused antenna elements, and some embodiments of the focused antenna elements are implemented according to a multiple feeds per beam (MFPB) architecture. In MFPB architectures, each antenna feed can be associated with a weighted and combined set of multiple feed signals. To form each weighted and combined set, multiple feed signals can be passed through phase shifters, summers, and/or other hardware that can adjust amplitude weights, phase, and/or other characteristics of the resulting combined feed signal according to applied coefficients. The applied coefficients can be stored in a beamforming coefficient memory on the satellite 140. The coefficients can be pre-computed and/or adaptively updated (e.g., using feedback to the satellite from the gateways), so that the resulting combined feed signals can generated statically or adaptively. Applying the coefficients effectively applies some beamforming to the feeder signals, which can be used to compensate for impairments in the feeder antenna pattern. For example, crosstalk can be predetermined (e.g., estimated or pre-computed) or measured using any of the approaches described above. Rather than using equalization or cancelation to remove the measured crosstalk, coefficients in the MFPB architecture can be used to apply limited beamforming to at least partially correct for the antenna impairments causing the crosstalk (e.g., in a predefined or adaptive manner). Some embodiments can use a hybrid of the categories of approaches. For example, equalization or cancelation can be used to remove measured crosstalk on one of the feeder uplink or downlink, and limited beamforming can be used to remove crosstalk on the other of the feeder uplink or downlink.

Effective implementation of MSSMFL can rely on proper mutual synchronization of signals among the spatially separated feeder links. A number of approaches can be used to implement such mutual synchronization, and those approaches can depend on characteristics (e.g., overlap, etc.) of the user and feeder coverage areas. For example, in the forward direction, the gateway terminals 130 transmit forward uplink signals to the satellite 140, which are received by antenna elements of the feeder antenna subsystem 230, communicated through forward-link pathways of the forward repeater subsystem 240 to the user antenna subsystem 250, and transmitted as forward downlink signals by antenna elements of the user antenna subsystem 250. To enable the transmitted forward downlink signals to spatially combine to form forward user beams, embodiments use feeder-side ground segment components to generate the feeder signals 135 as mutually synchronized, beam-weighted forward uplink signals. In general, the satellite 140 (e.g., the various components illustrated in FIG. 4) can be a means for relaying mutually phase-synchronized, beam-weighted uplink signals as phase-coherent downlink signals that spatially combine to form forward user beams. For example, the FAEs 243 can receive mutually phase-synchronized, beam-weighted uplink signals; and the signals can be passed through the forward repeater subsystem 240 and transmitted by the BAEs 247 as phase-coherent downlink signals that spatially combine to form forward user beams. To enable receipt of the forward uplink signals, embodiments include multiple, spatially separated means for communicating the mutually phase-synchronized, beam-weighted uplink signals; and means for mutually phase-synchronizing the uplink signals at the spatially separated means for communicating, so that the forward uplink signals will be received phase-synchronously by the means for relaying. For example, embodiments use ground components in conjunction with satellite signaling to mutually synchronize feeder-link signals between geographically distributed gateway terminals 130 and the satellite 140. Similarly, in the return direction, the user terminals transmit return uplink signals to the satellite 140, which are received by antenna elements of the user antenna subsystem 250, communicated through return-link pathways of the return repeater subsystem 340 to the feeder antenna subsystem 230, and transmitted as return downlink signals by antenna elements of the feeder antenna subsystem 230. Using feeder-side ground segment components to mutually synchronize and beam-weight the received return downlink signals can effectively form the return user beams from which the return uplink signals were transmitted.

Figure 5:
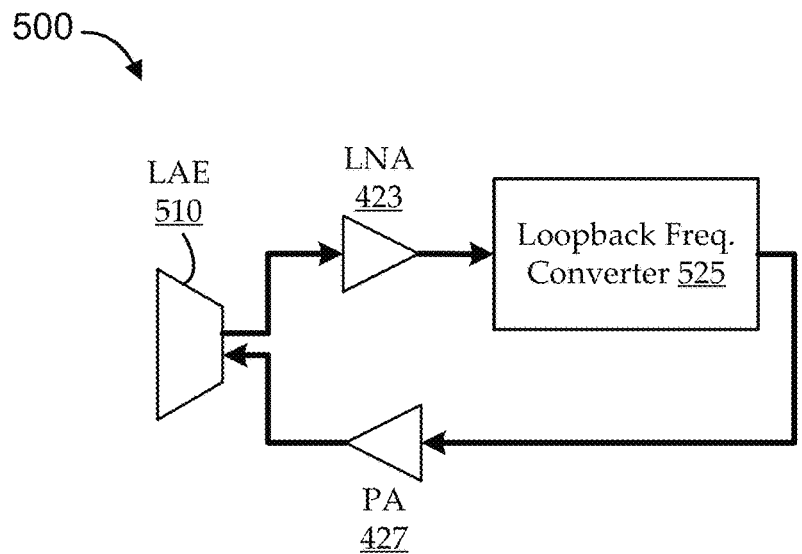
FIG. 5 shows a block diagram of an illustrative loopback pathway for loopback beacon signaling, according to various embodiments.

Some embodiments use a combination of satellite beacon signaling and loopback beacon signaling to enable mutual synchronization of the feeder-link signals. FIG. 5 shows a block diagram of an illustrative loopback signal path 500 for loopback beacon signaling, according to various embodiments. For example, each gateway terminal 130 can transmit a loopback beacon signal to the satellite 140, which is relayed from the satellite 140 back to the gateway terminal 130 via the loopback signal path 500. For each gateway terminal 130, the time elapsed between sending and receiving its loopback signal can be used to compute its distance from the satellite 140 or otherwise allow for phase delay in the feeder link to be compensated for. Similar to the forward and return-link pathways described above, a loopback pathway can include a loopback frequency converter 525 coupled between an LNA 423 and a PA 427. Unlike the forward and return-link pathways described above, both the input and output sides of the loopback pathway 500 can be in communication with a loopback antenna element (LAE) 510. In some implementations, the LNA 423 (input side) of the loopback pathway is coupled to the forward-link output of an FAE 243 (i.e., the LAE 510 can be implemented as a FAEs 243), and the PA 427 (output side) of the loopback pathway is coupled to the return-link input of the same or a different FAE 243. In some implementations, the LNA 423 of the loopback pathway is coupled to the forward-link output of an FAE 243, and the PA 427 of the loopback pathway is coupled to the forward-link input of a BAE 247 (e.g., where some or all gateway terminals 130 are within beam coverage areas associated with the user antenna subsystem 250). In some implementations, a separate loopback antenna subsystem is used. For example, the LAE 510 can be implemented as a coverage area antenna (e.g., including a wide-area horn) to receive and/or transmit loopback signals from/to some or all of the gateway terminals 130.

Figure 6:
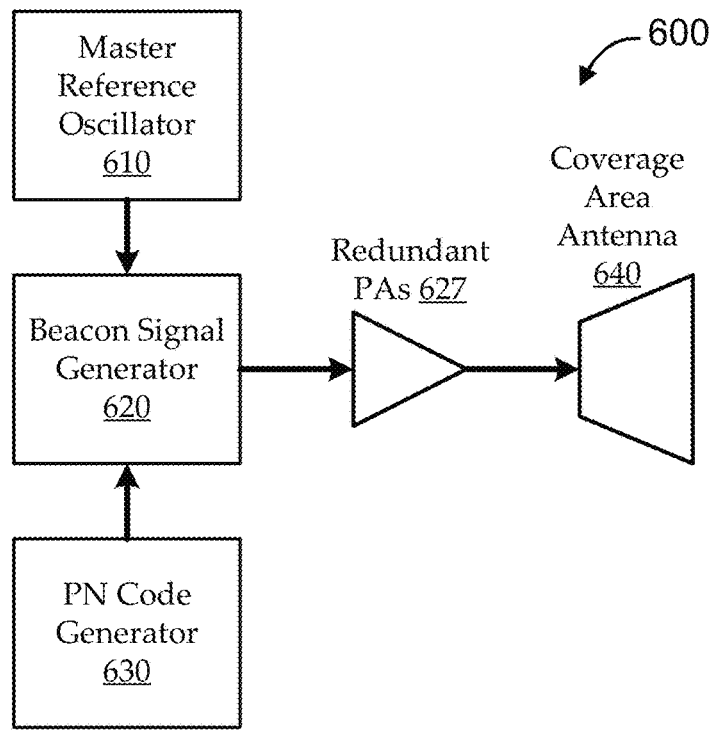
FIG. 6 shows a block diagram of a satellite beacon subsystem, according to various embodiments.

FIG. 6 shows a block diagram of a satellite beacon subsystem 600, according to various embodiments. As illustrated, the satellite beacon subsystem 600 can include a master reference oscillator 610, a beacon signal generator 620, a pseudo-noise (PN) code generator 630, redundant PAs 627, and a coverage area horn 640. The beacon signal generator 620 can combine clocking signaling based on the master reference oscillator 610 with PN signaling (e.g., using a code based on pseudorandom noise or any other suitable code) generated by the PN code generator 630 to generate a beacon signal. Such a beacon signal can effectively provide a precise phase reference (e.g., used for phase synchronization) and a timecode (e.g., used for symbol synchronization). Any other suitable beacon signaling can be generated. The beacon signal can be amplified by one or more redundant PAs 627 and transmitted via the coverage area antenna 640. In some implementations, the coverage area antenna 640 can include a wide-area horn. In other implementations, the coverage area antenna 640 can include components for forming a wide beam to illuminate some or all of the gateway terminals 130. In some implementations, the coverage area antenna 640 can also be used to transmit one or more relayed beacon signals.

Figure 13:
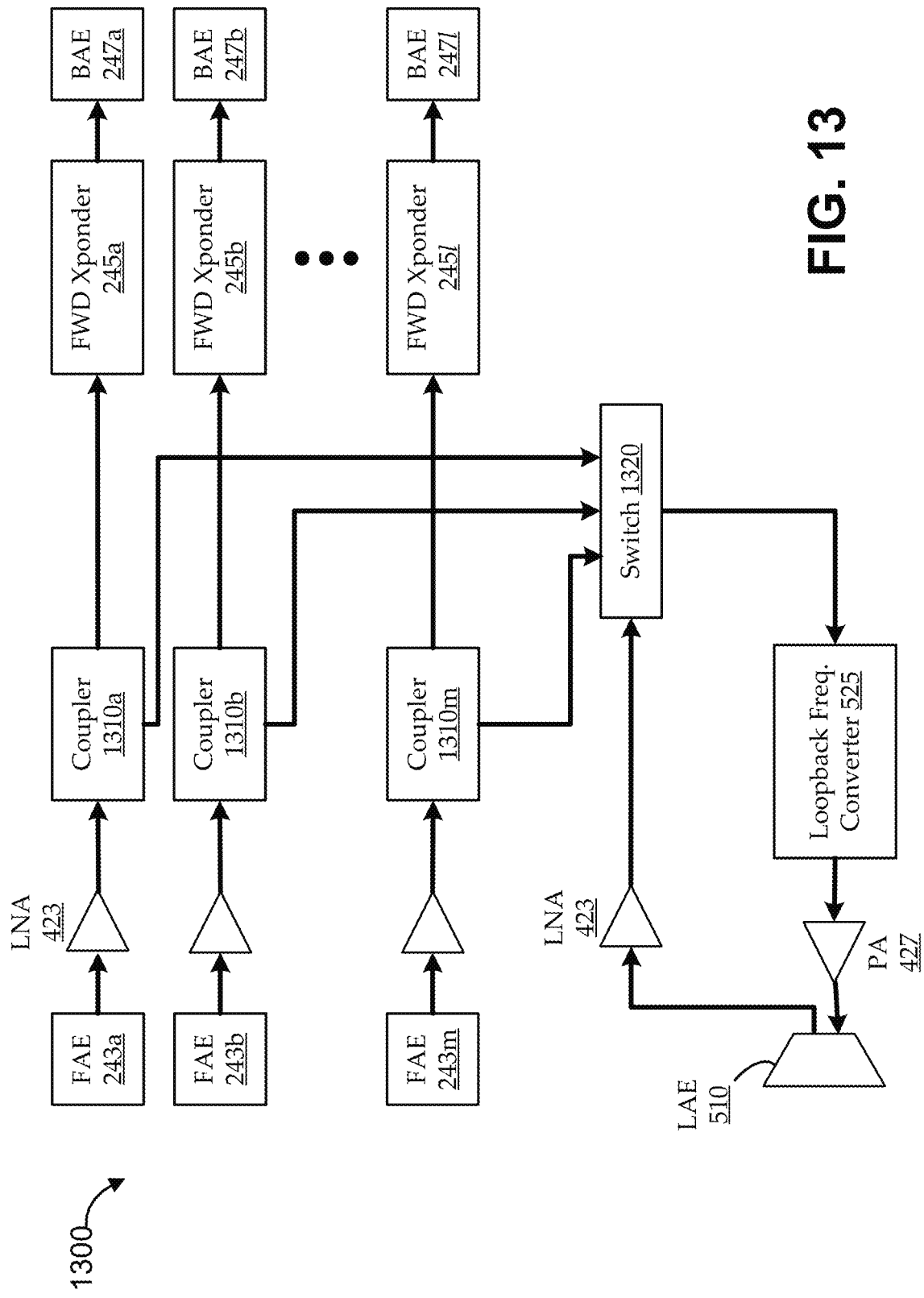
FIG. 13 shows a block diagram of an illustrative calibration system implemented on the satellite to assist in making forward-link measurements of feeder-link antenna pattern impairments.

As described above, some embodiments measure and/or compensate for feeder-link antenna pattern impairment arising, for example, from feeder reflector 410 distortion. Some approaches for measuring the feeder-link antenna pattern impairment can use calibration circuitry on the satellite 140 that exploits the loopback circuitry of the satellite 140. FIG. 13 shows a block diagram of an illustrative calibration system 1300 implemented on the satellite 140 to assist in making forward-link measurements of feeder-link antenna pattern impairments. The calibration system 1300 can include couplers 1310 and switch 1320, which can interface with the loopback frequency converter 525 described with reference to FIG. 5. Using switch 1320, the loopback frequency converter 525 can be timeshared (e.g., set to different modes during different timeslots of a frame) to support both mutual synchronization of the gateway terminals 130, as well as estimation of feeder-link antenna pattern impairment. During gateway synchronization time slots, the switch 1320 can be set to cause a received feeder uplink signal to be provided to the loopback frequency converter 525. During feeder antenna pattern impairment measurement time slots, the switch 1320 can be set to select one of the feeder antenna element 243 outputs to be provided to the loopback frequency converter 525. By cycling through each of the different feeder antenna elements 243 during different time slots, the gateway terminals 130 can measure the amount of uplink crosstalk between each of the FAEs 243. The couplers can be any of: a directional coupler, signal sampler, power divider, unequal power divider, and/or other suitable components. In some embodiments, gateway loopback signals are used for both gateway synchronization and pattern distortion estimation. The gateway loopback signals may be transmitted simultaneously with user traffic (e.g., gateway loopback signals are spread-spectrum-encoded), or may be transmitted during dedicated time slots where no user traffic is present.

Figure 14:
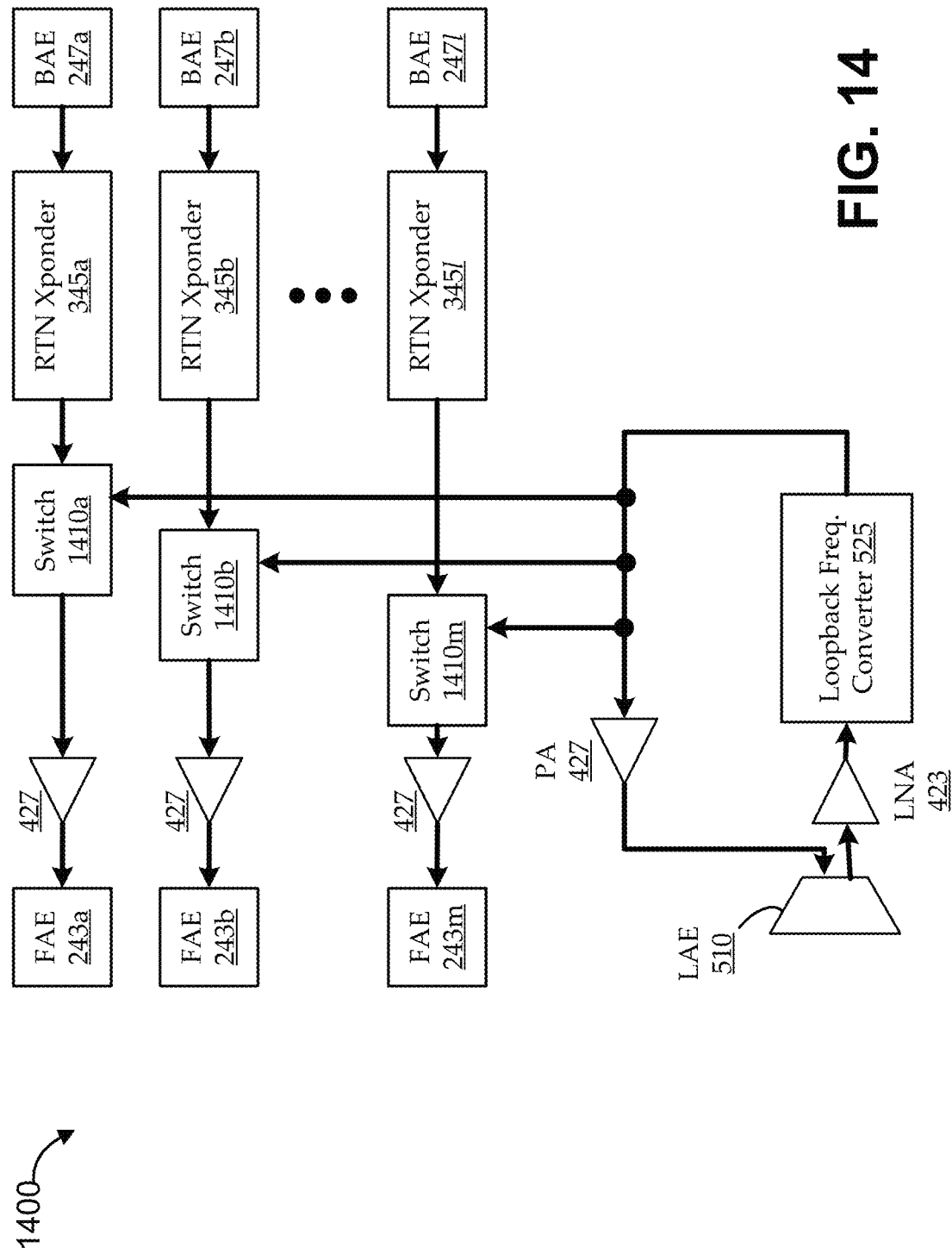
FIG. 14 shows a block diagram of an illustrative calibration system implemented on the satellite to assist in making return-link measurements of feeder-link antenna pattern impairments.

FIG. 14 shows a block diagram of an illustrative calibration system 1400 implemented on the satellite 140 to assist in making return-link measurements of feeder-link antenna pattern impairments. Operation can be similar to the forward-link calibration discussed above with reference to FIG. 13. Loopback signals transmitted through the loopback transponder can be selectively switched into individual feeder antenna feeds using switches 1410. Crosstalk on the feeder downlink can be measured by the gateway terminals 130. Return-link calibration can be performed during dedicated timeslots (with one of switches 1410 being set to provide the output of the loopback transponder to an individual feed). Alternatively, switches 1410 can be combiners, in which case return-link calibration may be performed simultaneously with transmission of return user traffic through the satellite 140.

Figure 7:
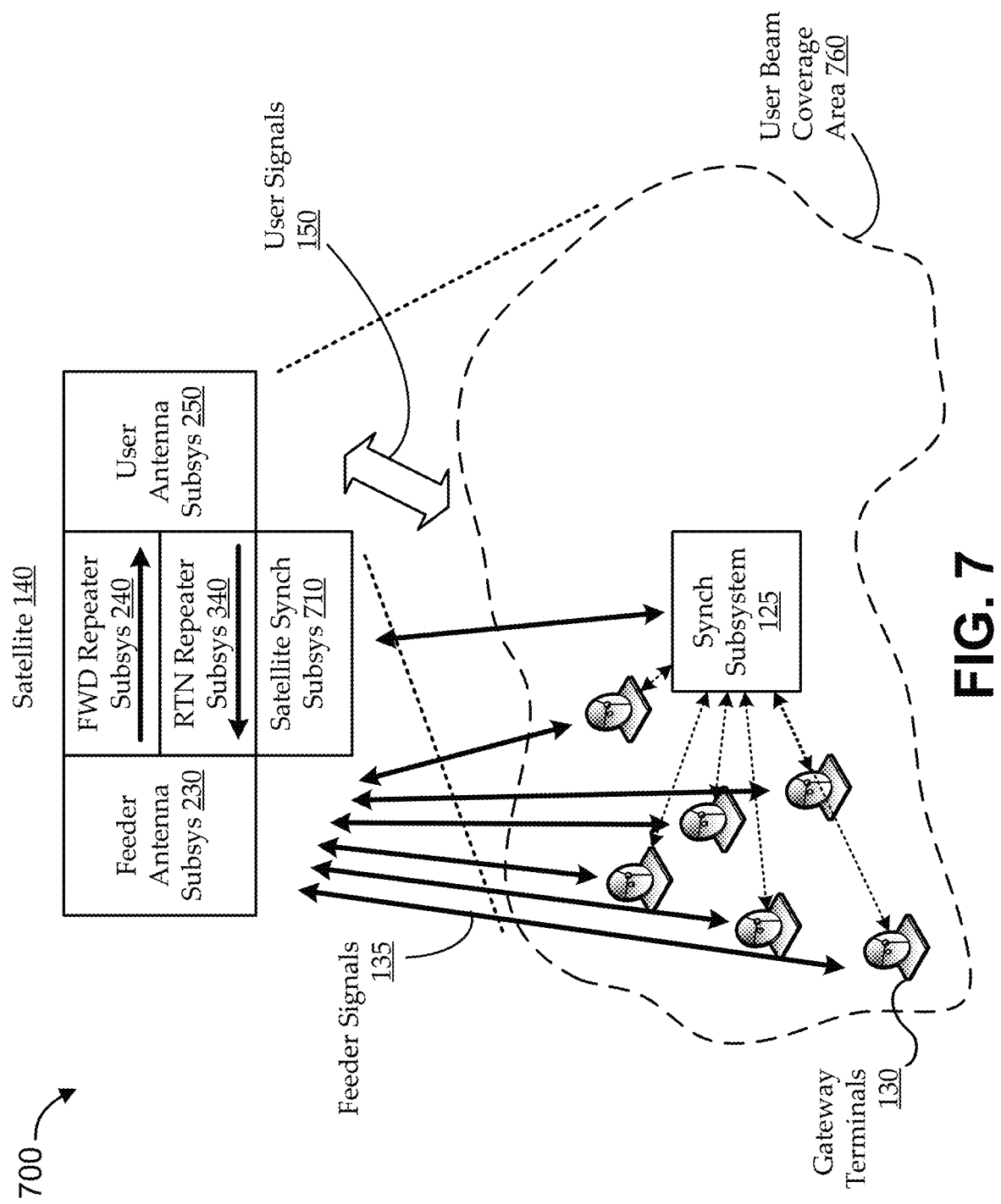
FIG. 7 shows an illustrative satellite communications system for providing MSSMFL, according to various embodiments.
Figure 8:
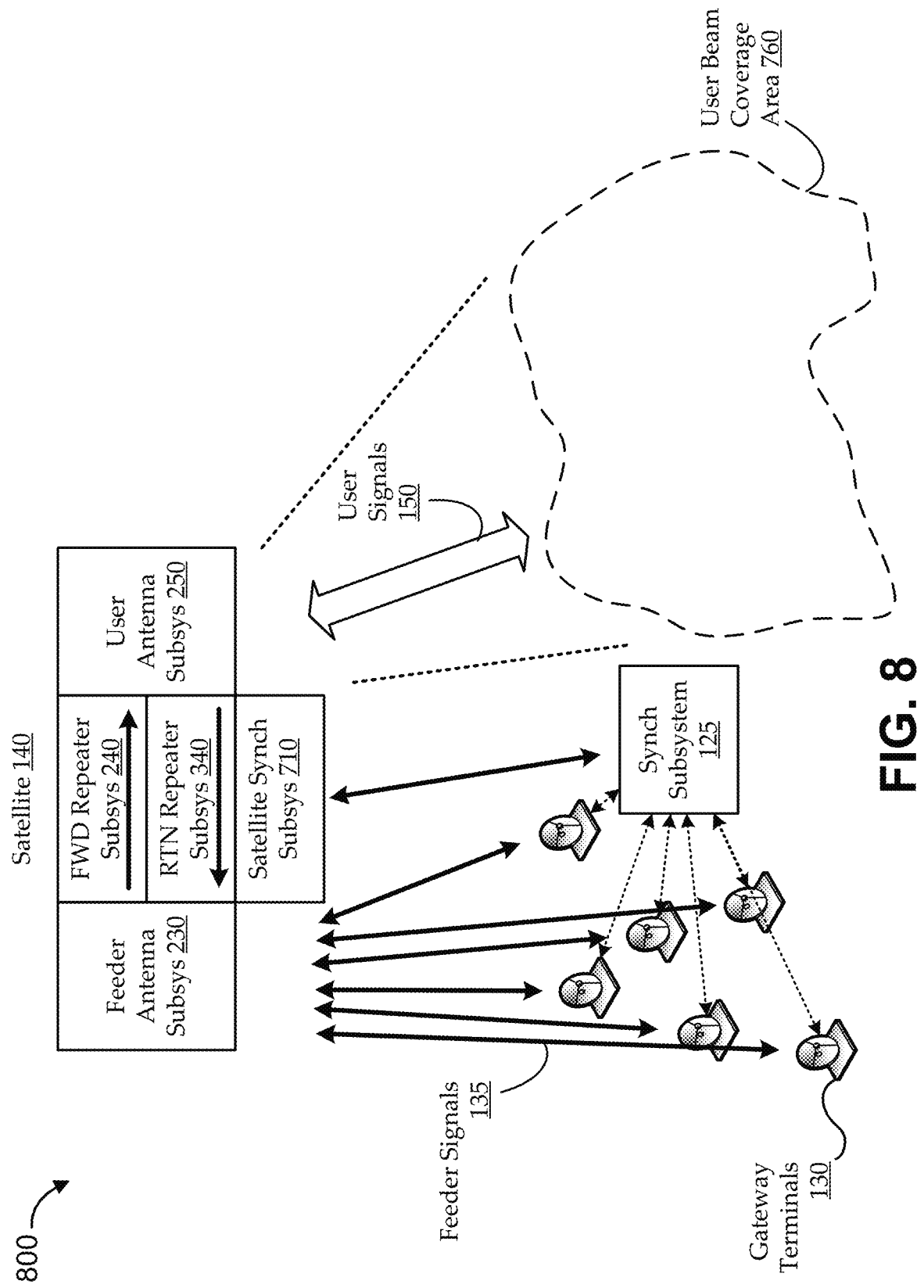
FIG. 8 shows another illustrative satellite communications system for providing MSSMFL, according to various embodiments.

Use of the loopback and satellite beacon signals for mutual synchronization is described further in context of FIGS. 7 and 8. FIG. 7 shows an illustrative satellite communications system 700 for providing MSSMFL, according to various embodiments. A satellite 140 provides communications between a number of geographically distributed gateway terminals 130 (via feeder signals 135) and a number of user terminals (via user signals 150). The satellite 140 includes a feeder antenna subsystem 230, a user antenna subsystem 250, a forward repeater subsystem 240, a return repeater subsystem 340, and a satellite synchronization subsystem 710. Both the gateway terminals 130 and the user terminals are disposed in a user beam coverage area 760 (e.g., which can be associated with one or more formed user beams, as described above). Though shown as a single, contiguous geographic region, the user beam coverage area 760 can be any suitable shape and/or size, may or may not be contiguous, may be the same or different in the forward and return directions, etc. Further, the geographic density and positioning of the gateway and user beams (and/or terminals) can be dictated according to reflector sizes, number of antenna elements, number of pathways, and/or other characteristics of the satellite communications system 700. For example, the feeder antenna subsystem 230 can include a number of focused antenna elements and a relatively large feeder reflector, so as to form relatively narrow, focused feeder beams (as compared to the reflector and beams of the user antenna subsystem 250). The relatively narrow beams can facilitate bandwidth reuse with closer spacing between the gateway terminals 130 (i.e., feeder beams can be more tightly packed into a geographic area without overlap).

Alternatively, some or all of the gateway terminals 130 can be distributed throughout the user beam coverage area 760.

In the forward and return directions, contours of the user beam coverage area 760 (e.g., which may or may not be the same in both directions) are defined by formed forward and return user beams, respectively. As described above, embodiments described herein form the user beams by providing ground-based beamforming of spatially multiplexed signals via spatially separated (geographically distributed) feeder links, and such spatially multiplexed ground-based beamforming can involve mutual synchronization of the feeder signals 135. Embodiments enable such mutual synchronization by coordination between a satellite synchronization subsystem 710 and one or more ground-based synchronization subsystems 125 (e.g., each gateway terminal 130 can include an instance of the ground-based synchronization subsystem 125).

In some embodiments, such coordination involves synchronization of the gateway terminals 130 according to loopback and satellite beacon signaling. For example, some embodiments of the satellite synchronization subsystem 710 include a loopback pathway (e.g., as described with reference to FIG. 5) and/or a beacon transmitter (e.g., as described with reference to FIG. 6). As described above, the satellite 140 can generate and transmit a beacon signal that can be received by the ground-based synchronization subsystem(s) 125, and the received beacon signal can be used, for example, to synchronize the phase of the reference oscillators in each gateway terminal 130 to the carrier phase of the satellite 140. Further, the ground-based synchronization subsystem(s) 125 can transmit and receive one or more loopback signals (e.g., a loopback beacon) via one or more loopback pathways in the satellite 140. The received loopback beacon signal can be used, for example, for range finding between each gateway terminal 130 and the satellite 140. Such range finding can enable mutual synchronization across the gateway terminals 130, so that gateway terminals 130 can adjust their uplink transmissions to be phase-synchronously received at the satellite 140.

While MSSMFL can take advantage of mutual phase-synchronization of the feeder-link signals, some implementations are less concerned with precise signal time-alignment. Generally, the carrier frequency is orders of magnitude faster than the data rate, and a small slip in time alignment typically will not have a noticeable impact on symbol timing provided that phase synchronization is maintained. In other words, occasional cycle slips can be tolerated provided that mutual phase relationships between the feeder-link signals is maintained. For example, if the carrier frequency is 50 GHz, and a typical round-trip time (between a gateway terminal 130 and the satellite 140) is 240 milliseconds, approximately twelve billion carrier cycles can elapse during a single round trip. As such, a slip in time alignment of even a few hundred carrier frequency cycles can be relatively insignificant with respect to data rates of 100 Mbps or higher. Still, some range finding (e.g., using the loopback signaling) can be desirable to facilitate certain functionality. For example, it can be desirable to ensure that changes in modulation occur for all forward uplink signals at approximately the same time (e.g., at a corresponding symbol boundary across the spatially multiplexed signals). Some embodiments can include further synchronization for symbol timing. Certain implementations can use the satellite beacon signal and/or the loopback signals for symbol timing synchronization. However, because the data rate is typically appreciably slower (e.g., 100 Mbps as compared to 15-75 GHz for Ku-band, Ka-band, V-band, etc.), many other techniques can be used. For example, other implementations can use global positioning satellite (GPS) timing information, or other techniques to achieve timing synchronization.

As illustrated, in the example satellite communications system 700, all the gateway terminals 130 may be disposed in the user beam coverage area 760. In such embodiments, some implementations of the satellite synchronization system 710 can exploit antenna elements of the user antenna subsystem 250 for downlink communications with the ground-based synchronization subsystem(s) 125 (e.g., via respective gateway terminals 130). In one such implementation, the feeder antenna subsystem 230 and the user antenna subsystem 250 both operate in a same frequency band (e.g., Ka-band), and the gateway terminals 130 can receive signals from the satellite synchronization system 710 via the user antenna subsystem 250.

For example, each antenna element of the feeder antenna subsystem 230 can receive a PN-coded loopback beacon signal from an associated gateway terminal 130 (each gateway terminal 130 can have its own unique PN code), and those loopback beacon signals can be transmitted by the user antenna subsystem 250 to the user beam cover areas 760 in which the gateway terminals 130 are located. Each gateway terminal 130 can receive some or all of the transmitted loopback signals (e.g., originating from some or all of the gateway terminals 130) and can correlate the received signals against its own PN code, thereby recovering its loopback beacon signal. The satellite synchronization system 710 can synchronize the gateway terminal 130 by aligning the recovered loopback beacon signal (e.g., phase- and/or time-aligning) with a satellite synchronization signal also received from the satellite 140. For example, the satellite 140 transmits a satellite synchronization signal encoded with a PN code not used by any of the gateway terminals 130).

In some such implementations, multiple reference locations (e.g., user terminals) can be used to determine forward-link beam weights. For example, the reference locations can include locations at or near the center of each (some or all) of the user beam coverage areas 760. Multiple (e.g., all) loopback beacon signals originating from multiple (e.g., all) gateway terminals 130 can be received by each reference location, and each reference location can correlate the gateway-specific PN codes with the received signals to recover the loopback beacon signals. As described herein, each of the recovered loopback beacon signals has traversed a forward link, including a forward uplink from a corresponding one of the gateway terminals 130 to the satellite 140, a forward pathway through the satellite 140, and a forward downlink from the satellite 140 to the reference location. Accordingly, the reference locations can use the recovered signals to compute forward beam weights for characterizing those forward links. The computed forward beam weights can be fed back to the forward beamformer (e.g., via the satellite 140, and gateway terminals 130), and the forward beamformer can determine whether to update the forward beam weights, accordingly.

FIG. 8 shows another illustrative satellite communications system 800 for providing MSSMFL, according to various embodiments. The satellite communications system 800 is similar to the satellite communications system 700 of FIG. 7, except that the gateway terminals 130 are disposed outside the user beam coverage area 760. In such embodiments, the satellite synchronization system 710 may not be able to exploit antenna elements of the user antenna subsystem 250 for downlink communications with the ground-based synchronization subsystem(s) 125 (e.g., via respective gateway terminals 130). Some embodiments of the satellite synchronization system 710 can implement loopback pathways using forward-link inputs and return-link outputs of the antenna elements of the feeder antenna subsystem 230, so that the loopback beacon signals are communicated in both directions as feeder signals 135. In some such embodiments, the ground-based synchronization subsystem(s) 125 can subtract out other feeder signals 135 to facilitate receipt of the beacon signals. PN codes and/or other techniques can be used to differentiate the synchronization signals from other feeder signals 135. For example, the PN-coded signal can be a relatively low-level signal (e.g., within or near the noise floor), and correlating the received signal with the known PN code and sufficient gain (e.g., 25-30 dB), can enable recovery of the signal.

Other embodiments of the satellite synchronization system 710 can include a dedicated loopback antenna subsystem. For example, the loopback antenna subsystem can include one or more broad-beam antennas to cover the entire region (or regions) in which gateway terminals 130 are disposed. In some such embodiments, where gateway terminals 130 are located outside of user beam coverage areas 760, the gateway terminals 130 and user terminals can operate in the same band or in different bands. For example, the gateway terminals 130 can communicate in the V-band, and the user terminals can communicate in the Ka-band.

Figure 9:
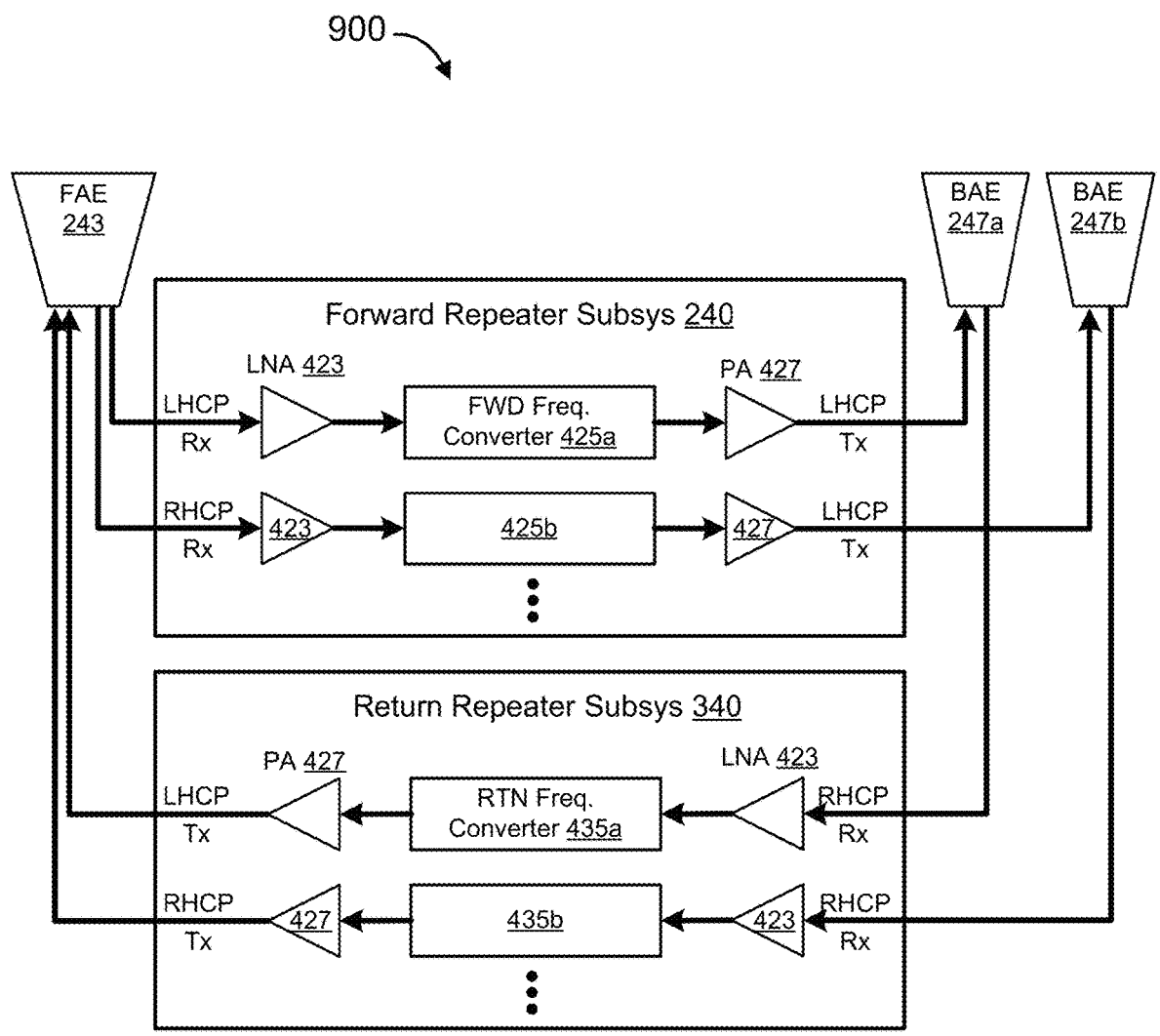
FIG. 9 shows a block diagram of an illustrative satellite system for providing MSSMFL using multiple polarization orientations, according to various embodiments.
Figure 10:
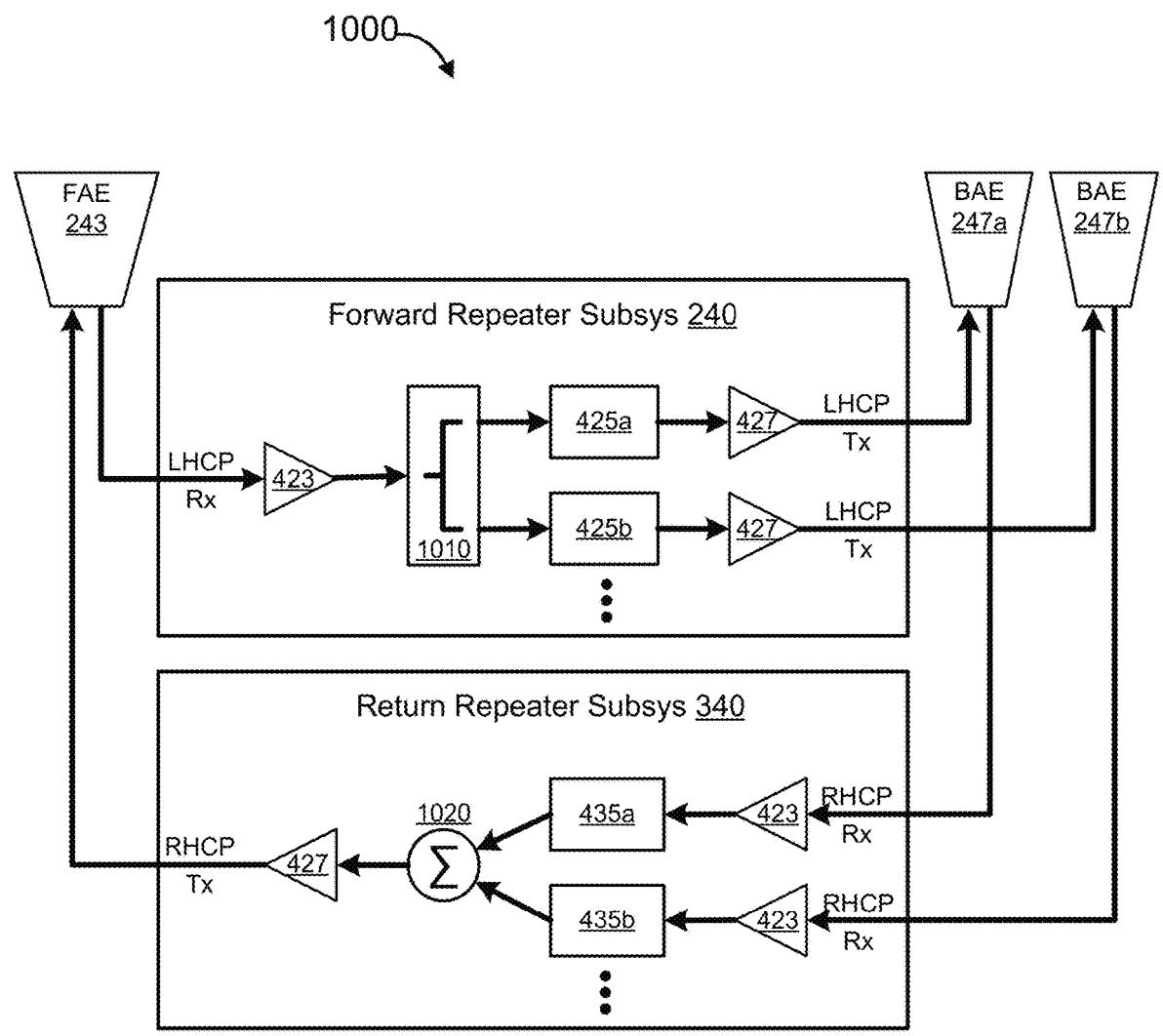
FIG. 10 shows a block diagram of an illustrative satellite system for providing MSSMFL using multiple frequency sub-ranges, according to various embodiments.

FIGS. 9 and 10 illustrate techniques for reducing the number of gateway terminals 130 for a MSSMFL deployment. FIG. 9 shows a block diagram of an illustrative satellite system 900 for providing MSSMFL using multiple signal polarizations, according to various embodiments, e.g., in a case with distinct user and gateway coverage areas such as illustrated in FIG. 8. The satellite system 900 can be similar to the satellite system 400 described with reference to FIG. 4, except that each of the multiple FAEs 243 (only one is shown for clarity) has multiple (e.g., two) forward-link inputs and multiple (e.g., two) return-link outputs. Each forward-link input and each return-link output operates in a particular polarization orientation. At the user antenna side, the BAEs 247 can each still have a single forward-link output and return-link input. For example, all forward-link outputs of all the BAEs 247 can operate at a first polarization orientation, while all return-link inputs of all the BAEs 247 can operate at a second polarization orientation. The polarization orientations used by the FAEs 243 can be the same as, or different from, those used by the BAEs 247. For example, the FAEs 243 can operate at left-hand circular polarization (LHCP) and right-hand circular polarization (RHCP), while the BAEs 247 can operate at linear (e.g., vertical and horizontal) polarizations. In cases where the FAEs 243 and the BAEs 247 both use circular polarization orientations (or where both use linear polarizations, etc.), interference can arise between the feeder-link and user-link communications. For example, in the illustrated implementation, LHCP is being used both for forward downlink signals and for some return downlink signals, and RHCP is being used both for forward uplink signals and for some return uplink signals. Such potential interference can be mitigated or avoided by locating gateway terminals 130 outside of user beams and/or by using various interference mitigation techniques (e.g., time or frequency multiplexing). Further, as described above, signals are passed between the FAEs 243 and the BAEs 247 via a forward repeater subsystem 240 having forward-link pathways, and via a return repeater subsystem 240 having return-link pathways. The forward-link and return-link pathways can be implemented in any suitable manner. As illustrated, each includes an LNA 423 at its input side, a PA 427 at its output side, and a frequency converter (425, 435) coupled between its LNA 423 and PA 427. Other implementations can include additional and/or alternative components.

In some embodiments, each FAE 243 has a first forward-link input at a first polarization orientation (e.g., LHCP), and a second forward-link input at a second polarization orientation (RHCP). The forward repeater subsystem 240 includes a first number of forward-link pathways that are each coupled between one of the first forward-link inputs and one of the forward-link outputs of a BAE 247 (e.g., operating at LHCP), and a second number of forward-link pathways that are each coupled between one of the second forward-link inputs and another of the forward-link outputs (e.g., also operating at LHCP). For example, the first and/or the second number of forward-link pathways can convert from the polarization orientation of the respective forward-link input to the different polarization orientation of the respective forward-link output. Similarly, each FAE 243 has a first return-link output at a first polarization orientation (e.g., LHCP) and a second return-link output at a second polarization orientation (e.g., RHCP). The return repeater subsystem 340 includes a first number of return-link pathways that are each coupled between one of the return-link inputs of a BAE 247 (e.g., operating at RHCP) and one of the first return-link outputs, and a second number of return-link pathways that are each coupled between one of the second return-link outputs and another of the return-link inputs (e.g., also operating at RHCP). Again, the first and/or the second number of return-link pathways can convert from the polarization orientation of the respective return-link input to the different polarization orientation of the respective return-link output.

In embodiments like the satellite system 900, each gateway terminal 130 can communicate with the satellite 140 using any suitable number (e.g., two) of orthogonal polarization orientations. Concurrent communications of feeder signals on multiple orthogonal polarization orientations can effectively enable each gateway terminal 130 to reuse the entirety of its allotted bandwidth in each polarization orientation without interference. For example, such techniques can facilitate deployment of higher capacity satellite communications systems with fewer gateway terminals 130. In such cases, the gateways can still cooperate to mutually synchronize their signals so that beamforming occurs.

FIG. 10 shows a block diagram of an illustrative satellite system 1000 for providing MSSMFL using multiple frequency sub-ranges, according to various embodiments. The satellite system 1000 can be similar to the satellite system 400 described with reference to FIG. 4, except that the forward feeder frequency range (received from each FAE 243) is separated into smaller forward user frequency sub-ranges for communication to respective coupled BAEs 247, and return user frequency sub-ranges (received from its coupled BAEs 247) are combined into a larger return feeder frequency range for communication to a respective coupled FAE 243. In some embodiments, each forward-link input of an FAE 243 is coupled with a frequency separator 1010 having a first frequency sub-range output and a second frequency sub-range output. The forward repeater subsystem 240 has a first number of forward-link pathways that are each coupled between the first frequency sub-range output of one of the frequency separators 1010 and one of the forward-link outputs (e.g., of a first BAE 247 operating in the first frequency sub-range), and a second number of forward-link pathways that are each coupled between the second frequency sub-range output of one of the frequency separators 1010 and another of the forward-link outputs (e.g., of a second BAE 247 operating in the second frequency sub-range). Similarly, each return-link output is coupled with a frequency combiner 1020 having a first frequency sub-range input and a second frequency sub-range input. The return repeater subsystem 340 has a number of return-link pathways that are each coupled between one of the return-link inputs (e.g., of a first BAE 247 operating in the first frequency) and the first frequency sub-range input of one of the frequency combiners 1020, and a second number of return-link pathways that are each coupled between another of the return-link inputs (e.g., of a second BAE 247 operating in the second frequency sub-range) and the second frequency sub-range input of one of the frequency combiners 1020.

In the illustrated implementation each frequency separator 1010 is coupled with the forward-link input of a respective FAE 243 via a respective LNA 423. In such an implementation, each forward-link pathway can be considered as including the LNA 423, a respective path through the frequency separator 1010, the forward frequency converter 425, and the PA 427. In each forward-link pathway, the respective forward frequency converter 425 is coupled with a different output of the frequency separator 1010 and converts a respective frequency sub-range. For example, each of forward frequency converter 425a and forward frequency converter 425b can include components that are selected and/or adapted to tune its frequency conversion to its respective frequency sub-range. Similarly, in the illustrated implementation, each frequency combiner 1020 is coupled with the return-link output of a respective FAE 243 via a respective PA 427. In such an implementation, each return-link pathway can be considered as including the LNA 423, the return frequency converter 435, a respective path through the frequency combiner 1020, and the PA 427. In each return-link pathway, the respective return frequency converter 435 is coupled with a different output of the frequency combiner 1020 and converts a respective frequency sub-range. For example, each of return frequency converter 435a and return frequency converter 435b can include components that are selected and/or adapted to tune its frequency conversion to its respective frequency sub-range.

In the illustrated embodiment, LHCP is used for forward uplink signals and forward downlink signals, and RHCP is used for return uplink signals and return downlink signals. This and other polarization schemes can be used to avoid interference between user-link and feeder-link communications. In other implementations, other types of interference mitigation can be used. For example, in one embodiment, a first polarization orientation is used by both forward and return uplink signals, and a second polarization orientation is used by both forward and return downlink signals; but gateway and user terminals communicate using different frequencies and/or time slots.

In embodiments like the satellite system 1000, each gateway terminal 130 can communicate with the satellite 140 using a feeder frequency range that encompasses any suitable number (e.g., two) of frequency sub-ranges. The sub-ranges may or may not be contiguous, overlapping, the same size, etc. Use of the frequency sub-ranges can enable each gateway terminal 130 to feed multiple BAEs 247, thereby adding frequency multiplexing to the spatial multiplexing of the gateway terminals 130. Using frequency multiplexing does result in some feeder bandwidth expansion; for example, using two frequency sub-ranges result in twice the bandwidth on the feeder link as on the user link. However, unlike conventional GBBF, where the bandwidth expansion is proportional to the number of user antenna elements (e.g., hundreds), bandwidth expansion for MSSMFL is proportional to the amount of frequency multiplexing (e.g., between one and ten). Stated another way, MSSMFL can allow tradeoffs between the feeder link bandwidth and number of gateways, an ability not provided by conventional GBBF.

Techniques, such as those described with reference to FIGS. 9 and 10, can support a same amount of user-link bandwidth with fewer gateway terminals 130. For example, suppose a satellite has L BAEs 247, and each BAE 247 is allocated X GHz of user-link bandwidth, such that at least L×X GHz of feeder-link bandwidth is needed to fully exploit the allocated user-link bandwidth. Embodiments of MSSMFL use mutually synchronized spatial multiplexing to enable GBBF with the L BAEs 247, while spreading the supporting L×X GHz of feeder-link bandwidth over M gateway terminals 130. Where M=L, each gateway terminal 130 can be allocated X GHz of feeder-link bandwidth. As described in FIGS. 9 and 10, some embodiments can use frequency and/or polarization multiplexing to permit a single gateway terminal 130 to support multiple BAEs 247, such that M can be less than L. For example, in some implementations, techniques described with reference to FIGS. 9 and 10 can be used in conjunction (e.g., multiple frequency sub-ranges within each of multiple polarization orientations) to further reduce the number of gateway terminals 130 needed to support a same amount of user-link bandwidth.

Figure 11:
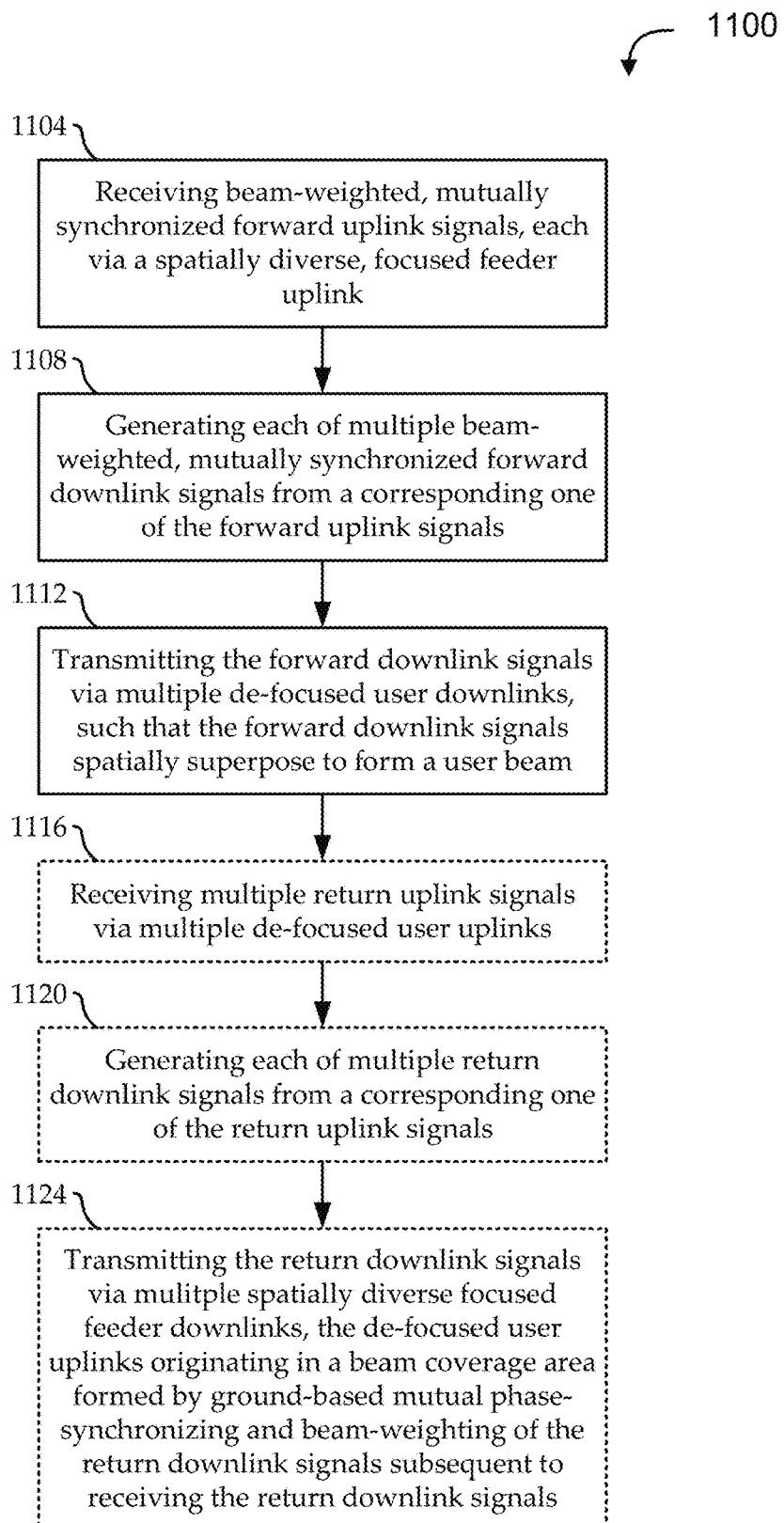
FIG. 11 shows a flow diagram of an illustrative method for ground-based beamforming with MSSMFL in a satellite communications system, according to various embodiments.

FIG. 11 shows a flow diagram of an illustrative method 1100 for ground-based beamforming with MSSMFL in a satellite communications system, according to various embodiments. The method 1100 begins at stage 1104 by receiving multiple beam-weighted, mutually synchronized (e.g., mutually phase-synchronized) forward uplink signals, each received via a focused feeder uplink. For example, L feeder uplinks can be received from M geographically distributed gateway terminals 130. Some embodiments of the method 1100 beam-weight a forward data stream to generate L beam-weighted forward signals, and communicate each of the L beam-weighted forward signals to a corresponding one of M spatially separated gateway locations. The beam-weighted forward signals can be synchronized (e.g., mutually phase-synchronized) at the gateway locations to generate L beam-weighted, mutually synchronized forward uplink signals. According to some embodiments, the synchronizing includes: receiving a beacon signal at the transmission locations, the beacon signal generated by and transmitted from a relay (e.g., from a wireless relay that performs the receiving at stage 1104); receiving, at each transmission location, a respective loopback signal transmitted from the transmission location (e.g., and relayed back to the transmission location via the relay); and phase-synchronizing, at each transmission location, the received respective loopback signal with the received beacon signal.

At stage 1108, embodiments generate each of multiple beam-weighted, mutually synchronized forward downlink signals from a corresponding one of the forward uplink signals (e.g., via a forward repeater system of a satellite or other suitable relay). In some embodiments, the receiving is at an uplink frequency range, the transmitting is at a downlink frequency range, and the generating at stage 1108 includes converting from the uplink frequency range to the downlink frequency range. At stage 1112, embodiments transmit the forward downlink signals via multiple defocused user downlinks, such that the forward downlink signals spatially superpose to form a user beam. In some embodiments, the forward downlink signals spatially superpose to form K user beams, and the beam-weighting includes applying L×K beam weights to K forward data streams to generate the L beam-weighted forward data signals.

Some embodiments continue at stage 1116 by receiving a multiple return uplink signals via multiple de-focused user uplinks (e.g., from multiple user terminals in one or more return user beam coverage areas). At stage 1120, embodiments generate each of multiple return downlink signals from a corresponding one of the return uplink signals. At stage 1124, embodiments transmit the forward downlink signals via multiple spatially separated focused feeder downlinks, the de-focused user uplinks originating in a beam coverage area formed by ground-based mutual phase-synchronizing and beam-weighting of the return downlink signals subsequent to receiving the return downlink signals.

The above description provides various systems and methods that can be used to provide ground-based beamforming with mutually synchronized, spatially multiplexed feeder links. Some illustrative examples are provided for added clarity. According to a first example, a satellite includes 400 elements and produces 200 beams. The uplink and downlink communications are both in the Ka band (3.5 Gigahertz bandwidth). 200 gateway terminals can be used with dual-polarization and no frequency multiplexing on the feeder link, and single polarization can be supported on the user link. A spectral efficiency of 1.5 bits per second per Hertz (bps/Hz) yields approximately 5 Gbps per beam (i.e., at 3.5 Gigahertz per beam), and 5 Gbps/beam times 200 beams yields approximately one Terabit per second of total capacity.

According to a second example, a satellite includes 512 elements and produces 128 beams. The uplink and downlink communications are both in the Ka band, with 2 Gigahertz of user-beam bandwidth and 4 Gigahertz of feeder-beam bandwidth. 128 gateway terminals can be used with dual-polarization and dual-frequency multiplexing on the feeder link, and single polarization can be supported on the user link. A spectral efficiency of 3 bps/Hz yields approximately 6 Gbps per user beam (i.e., at 2 Gigahertz per user beam), and 6 Gbps/beam times 128 beams yields approximately 768 Gbps of total capacity.

According to a third example, a satellite includes 768 elements and produces 354 beams. The feeder link operates in V band with 7.5 Gigahertz of feeder-beam bandwidth, and the user link operates in Ka band with 2.5 Gigahertz of user-beam bandwidth. 150 gateway terminals can be used with dual-polarization and triple-frequency multiplexing on the feeder link, and single polarization can be supported on the user link. A spectral efficiency of 1 bps/Hz yields approximately 2.5 Gbps per user beam (i.e., at 2.5 Gigahertz per user beam), and 2.5 Gbps/beam times 200 beams yields approximately 500 Gbps of total capacity.

According to a fourth example, a satellite includes 768 elements and produces 354 beams. The feeder link operates in V band with 7 Gigahertz of feeder-beam bandwidth, and the user link operates in Ka band with 3.5 Gigahertz of user-beam bandwidth. 192 gateway terminals can be used with dual-polarization and dual-frequency multiplexing on the feeder link, and single polarization can be supported on the user link. A spectral efficiency of 1.2 bps/Hz yields approximately 4 Gbps per user beam (i.e., at 3.5 Gigahertz per user beam), and 4 Gbps/beam times 354 beams yields approximately 1.4 Tbps of total capacity.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A satellite comprising:
  a feeder antenna subsystem comprising a plurality of focused-beam antenna elements (FAEs), each having a forward-link FAE port;
  a user antenna subsystem comprising an array of beam-forming antenna elements (BAEs), each having a forward-link BAE port; and
  a forward repeater subsystem having a forward uplink frequency range and a forward downlink frequency range, the forward repeater subsystem comprising a plurality of forward-link pathways, each of the plurality of forward-link pathways being coupled between one of the forward-link FAE ports and one of the forward-link BAE ports, and each of the plurality of forward-link pathways having an input in the forward uplink frequency range and an output in the forward downlink frequency range;
  such that a plurality of forward downlink signals is generatable from beam-weighted, mutually phase-synchronized forward uplink signals that are each received at a respective one of the FAEs from a corresponding one of a plurality of geographically distributed gateway terminals, the plurality of geographically distributed gateway terminals all to operate at a same carrier frequency, and
  such that transmission of the forward downlink signals by the BAEs causes the forward downlink signals to spatially superpose to form at least one forward user beam.

2. The satellite of claim 1, further comprising:
  a satellite synchronization subsystem having a beacon transmitter,
  wherein the forward uplink signals are synchronized prior to receipt at the FAEs in accordance with a synchronization signal transmitted by the beacon transmitter.

3. The satellite of claim 1, wherein:
  each FAE has a first forward-link FAE port at a first polarization orientation, and a second forward-link FAE port at a second polarization orientation;
  the plurality of forward-link pathways comprises:
    a first plurality of forward-link pathways, each coupled between one of the first forward-link FAE ports and one of the forward-link BAE ports; and
    a second plurality of forward-link pathways, each coupled between one of the second forward-link FAE ports and another of the forward-link BAE ports.

4. The satellite of claim 1, wherein:
  each forward-link input is coupled with a frequency separator having a first frequency sub-range output and a second frequency sub-range output; and
  the plurality of forward-link pathways comprises:
    a first plurality of forward-link pathways, each coupled between the first frequency sub-range output of one of the frequency separators and one of the forward-link BAE ports; and
    a second plurality of forward-link pathways, each coupled between the second frequency sub-range output of one of the frequency separators and another of the forward-link BAE ports.

5. The satellite of claim 1, further comprising a return repeater subsystem having a return uplink frequency range and a return downlink frequency range, wherein:

each FAE of the feeder antenna subsystem further has a return-link FAE port;
each BAE of the user antenna subsystem further has a return-link BAE port; and
the return repeater subsystem comprises a plurality of return-link pathways, each coupled between one of the return-link BAE ports and one of the return-link FAE port, and each having an input in the return uplink frequency range and an output in the return downlink frequency range,
such that a plurality of return downlink signals is generable by the return-link pathways for transmission by the FAEs, the return downlink signals generable from return uplink signals received at the BAEs from at least one user terminal, thereby forming at least one return user beam for communications with the at least one user terminal.

6. The satellite of claim 5, wherein:
each FAE has a first return-link FAE port at a first polarization orientation and a second return-link FAE port at a second polarization orientation;
each BAE has a first return-link BAE port at the first polarization orientation and a second return-link BAE port at the second polarization orientation; and
the plurality of return-link pathways comprises:
 a first plurality of return-link pathways, each coupled between one of the first return-link BAE ports and one of the first return-link FAE ports; and
 a second plurality of return-link pathways, each coupled between one of the second return-link BAE ports and one of the second return-link FAE ports.

7. The satellite of claim 5, wherein:
each return-link FAE port is coupled with a frequency combiner having a first frequency sub-range input and a second frequency sub-range input; and
the plurality of return-link pathways comprises:
 a first plurality of return-link pathways, each coupled between one of the return-link BAE ports and the first frequency sub-range input of one of the frequency combiners; and
 a second plurality of return-link pathways, each coupled between another of the return-link BAE ports and the second frequency sub-range input of one of the frequency combiners.

8. The satellite of claim 5, wherein:
the forward uplink frequency range overlaps the return uplink frequency range; and
the forward downlink frequency range overlaps the return downlink frequency range.

9. The satellite of claim 1, wherein:
the feeder antenna subsystem further comprises a feeder reflector; and
the user antenna subsystem further comprises a user reflector.

10. A satellite communications system comprising:
a plurality of geographically distributed gateway terminals, the plurality of geographically distributed gateway terminals all operating at a same carrier frequency, and each comprising:
 a beam-weighted forward signal input in communication with a forward beamformer via a distribution network;
 a synchronization input coupled with a synchronization subsystem; and
 a feeder uplink signal output that corresponds to a mutually synchronized version of the beam-weighted forward signal input in accordance with the synchronization input; and
a satellite comprising:
 a feeder antenna subsystem comprising a plurality of focused-beam antenna elements (FAEs), each FAE having a forward-link FAE port that is communicatively coupled with the feeder uplink signal output of a corresponding one of the gateway terminals;
 a user antenna subsystem comprising an array of beam-forming antenna elements (BAEs), each having a forward-link BAE port; and
 a forward repeater subsystem having a forward uplink frequency range and a forward downlink frequency range, the forward repeater subsystem comprising a plurality of forward-link pathways, each coupled between one of the forward-link FAE ports and one of the forward-link BAE ports, and each having an input in the forward uplink frequency range and an output in the forward downlink frequency range,
 such that a plurality of forward downlink signals is generated from forward uplink signals received at the FAEs, such that transmission of the forward downlink signals by the BAEs causes the forward downlink signals to spatially superpose to form forward user beams.

11. The satellite communications system of claim 10, wherein:
each FAE has a first forward-link FAE port at a first polarization orientation, and a second forward-link FAE port at a second polarization orientation;
the plurality of forward-link pathways comprises:
 a first plurality of forward-link pathways, each coupled between one of the first forward-link FAE ports and one of the forward-link BAE ports; and
 a second plurality of forward-link pathways, each coupled between one of the second forward-link FAE ports and another of the forward-link BAE ports.

12. The satellite communications system of claim 10, wherein:
each forward-link input is coupled with a frequency separator having a first frequency sub-range output and a second frequency sub-range output; and
the plurality of forward-link pathways comprises:
 a first plurality of forward-link pathways, each coupled between the first frequency sub-range output of one of the frequency separators and one of the forward-link BAE ports; and
 a second plurality of forward-link pathways, each coupled between the second frequency sub-range output of one of the frequency separators and another of the forward-link BAE ports.

13. The satellite communications system of claim 10, wherein:
each geographically distributed gateway terminal further comprises:
 a return signal output in communication with a return beamformer via the distribution network; and
 a feeder downlink signal input; and
each FAE of the feeder antenna subsystem further has a return-link FAE port;
each BAE of the user antenna subsystem further has a return-link BAE port; and
the satellite further comprises a return repeater subsystem having a return uplink frequency range and a return downlink frequency range, wherein the return repeater subsystem comprises a plurality of return-link pathways, each coupled between one of the return-link BAE ports and one of the return-link FAE ports, and each having an input in the return uplink frequency range and an output in the return downlink frequency range, such that a plurality of return downlink signals is generable by the return-link pathways for transmission by the FAEs, the return downlink signals generable from return uplink signals received at the BAEs from at least one user terminal, thereby forming at least one return user beam for communications with the at least one user terminal.

14. The satellite communications system of claim 13, wherein:
each FAE has a first return-link FAE port at a first polarization orientation and a second return-link FAE port at a second polarization orientation;
each BAE has a first return-link BAE port at the first polarization orientation and a second return-link BAE port at the second polarization orientation; and
the plurality of return-link pathways comprises:
a first plurality of return-link pathways, each coupled between one of the first return-link BAE ports and one of the first return-link FAE ports; and
a second plurality of return-link pathways, each coupled between one of the second return-link BAE ports and one of the second return-link FAE ports.

15. The satellite communications system of claim 13, wherein:
each return-link FAE port is coupled with a frequency combiner having a first frequency sub-range input and a second frequency sub-range input; and
the plurality of return-link pathways comprises:
a first plurality of return-link pathways, each coupled between one of the return-link BAE ports and the first frequency sub-range input of one of the frequency combiners; and
a second plurality of return-link pathways, each coupled between another of the return-link BAE ports and the second frequency sub-range input of one of the frequency combiners.

16. The satellite communications system of claim 13, wherein:
the forward uplink frequency range overlaps the return uplink frequency range; and
the forward downlink frequency range overlaps the return downlink frequency range.

17. The satellite communications system of claim 10, wherein:
the feeder antenna subsystem further comprises a feeder reflector; and
the user antenna subsystem further comprises a user reflector.

18. The satellite communications system of claim 17, wherein:
surface distortions on the feeder reflector define feeder antenna impairment regions; and
the plurality of geographically distributed gateway terminals are positioned away from the feeder antenna impairment regions.

19. The satellite communications system of claim 17, wherein:
surface distortions on the feeder reflector define feeder antenna impairment regions; and the feeder antenna subsystem comprises a multiple feeds per beam antenna to apply limited beamforming to feeder beams to compensate for the feeder antenna impairment regions.

20. The satellite communications system of claim 19, wherein:
the multiple feeds per beam antenna comprises a beamforming coefficient memory having pre-computed beamforming coefficients stored therein, the pre-computed beamforming coefficients used to apply the limited beamforming.

21. The satellite communications system of claim 19, wherein:
the multiple feeds per beam antenna comprises a beamforming coefficient memory having adaptively updated coefficients stored therein, the adaptively updated coefficients used to apply the limited beamforming.

22. The satellite communications system of claim 10, wherein:
the plurality of geographically distributed gateway terminals comprises M gateway terminals; and
the forward repeater subsystem comprises M forward-link pathways, each corresponding to a respective one of the M gateway terminals.

23. The satellite communications system of claim 10, wherein the feeder uplink signal output corresponds to a phase-synchronized version of the beam-weighted forward signal input responsive to the synchronization input.

24. The satellite communications system of claim 10, wherein:
the satellite further comprises a beacon transmitter; and
the synchronization subsystem comprises:
a loopback input; and
a synchronization output coupled with the synchronization input, the synchronization output responsive to phase-synchronization of a beacon signal and a loopback signal both received at the loopback input.

25. The satellite communications system of claim 24, wherein each gateway terminal further comprises a loopback transmitter.

26. The satellite communications system of claim 10, wherein each gateway terminal further comprises a local instance of the synchronization subsystem.

27. The satellite communications system of claim 10, further comprising:
the synchronization subsystem, wherein each of the plurality of geographically distributed gateway terminals is coupled with the synchronization subsystem via the distribution network.

28. The satellite communications system of claim 10, further comprising:
a crosstalk canceler having:
a plurality of feed input ports to receive feed input signals from the plurality of gateway terminals; and
a plurality of feed output ports to transmit crosstalk-compensated feed signals, the crosstalk-compensated feed signals generated as a function of the feed input signals and a stored crosstalk matrix.

29. The satellite communications system of claim 28, wherein the crosstalk canceler is disposed in the beamformer.

30. The satellite communications system of claim 10, wherein:
the satellite further comprises a loopback pathway having a loopback antenna element that is coupled with the FAEs via a plurality of switches, such that, over a plurality of time slots, the loopback antenna element is sequentially coupled with the respective forward-link FAE port of each of the FAEs, thereby, in each of the time slots, transmitting a repeated loopback signal to the gateway terminals in response to receiving a loopback beacon signal from the gateway terminal associated with the FAE that is sequentially coupled in the time slot.

31. The satellite communications system of claim 13, wherein:
the satellite further comprises a loopback pathway having a loopback antenna element that is coupled with the FAEs via a plurality of switches,
such that, over a plurality of time slots, the loopback antenna element is sequentially coupled with the respective return-link FAE port of each of the FAEs, thereby, in each of the time slots, transmitting a repeated loopback signal to the gateway terminal associated with the FAE that is sequentially coupled in the time slot in response to receiving a loopback beacon signal from the gateway terminals.

32. The satellite communications system of claim 10, wherein:
the feeder antenna subsystem illuminates a plurality of forward feeder beams; and
the formed forward user beams do not spatially overlap with the forward feeder beams.

33. The satellite communications system of claim 10, further comprising:
the forward beamformer, which comprises:
a plurality of forward data stream inputs;
a beam weight input indicating beam weights associated with each of the gateway terminals and forward data streams; and
a plurality of beam-weighted forward signal outputs, each coupled with the beam-weighted forward signal input of a respective one of the gateway terminals via the distribution network, and each being a weighted sum of the forward data stream inputs beam-weighted according to the beam weights associated with the respective one of the gateway terminals.

34. The satellite communications system of claim 33, wherein:
the forward data stream input comprises K forward data stream inputs, each corresponding to a respective one of K formed forward user beams;
the plurality of geographically distributed gateway terminals comprises L feeder uplink signal outputs; and
the beam weight input comprises L×K beam weights; and
the beam-weighted forward signal outputs correspond to L composites of the K forward data stream inputs beam-weighted according to the L×K beam weights.

35. The satellite communications system of claim 10, wherein the satellite is a geostationary satellite.

36. A method for ground-based beamforming in a satellite communications system, the method comprising:
receiving a plurality of beam-weighted mutually synchronized forward uplink signals, each received via one of a plurality of focused feeder uplink antenna elements from a corresponding one of a plurality of spatially separated gateway locations, wherein the plurality of spatially separated gateway locations all operate at a same carrier frequency, the plurality of focused feeder uplink antenna elements being focused-beam antenna element (FAE) of a feeder antenna system of a satellite;
generating each of a plurality of forward downlink signals by amplifying and frequency converting a corresponding one of the plurality of forward uplink signals; and
transmitting the plurality of forward downlink signals via a plurality of de-focused user downlink antenna elements, such that the forward downlink signals spatially superpose to form a user beam, the plurality of de-focused user downlink antenna elements being beam-forming antenna element (BAE) of a user antenna system of the satellite coupled with the FAEs via forward-link pathways.

37. The method of claim 36, further comprising:
applying beam-weighting to a plurality of forward data stream to generate L beam-weighted forward signals;
communicating each of the L beam-weighted forward signals to a corresponding one of M spatially separated gateway locations; and
synchronizing the beam-weighted forward signals at the gateway locations to generate L beam-weighted, mutually synchronized forward uplink signals.

38. The method of claim 37, wherein:
the forward downlink signals spatially superpose to form K user beams; and
the beam-weighting comprises applying L×K beam weights to K forward data streams to generate the L beam-weighted forward signals.

39. The method of claim 36, wherein:
the receiving is at an uplink frequency range;
the transmitting is at a downlink frequency range; and
the frequency converting comprises converting from the uplink frequency range to the downlink frequency range.

40. The method of claim 36, further comprising:
receiving a plurality of return uplink signals via a plurality of de-focused user uplink antenna elements;
generating each of a plurality of return downlink signals from a corresponding one of the plurality of return uplink signals; and
transmitting the plurality of return downlink signals via a plurality of focused feeder downlink antenna elements to the spatially separated gateway locations,
the de-focused user uplinks originating in a beam coverage area formed by ground-based mutual phase-synchronizing and beam-weighting of the return downlink signals subsequent to transmitting the return downlink signals.

41. The method of claim 40, further comprising:
receiving the plurality of return downlink signals at the spatially separated gateway locations;
synchronizing the return downlink signals at the gateway locations to generate a plurality of mutually synchronized return signals; and
beam-weighting the plurality of mutually synchronized return signals to generate beam-weighted mutually synchronized return signals.

42. The method of claim 41, wherein:
the beam-weighted mutually synchronized return signals comprise L beam-weighted mutually synchronized return signals;
the formed beam coverage area comprises K user beams; and
beam-weighting the plurality of mutually synchronized return signals comprises applying L×K return beam weights to the L beam-weighted mutually synchronized return signals to recover K return data streams.

43. The method of claim 40, wherein:
the plurality of return uplink signals are received at a return uplink frequency range;
the plurality of return downlink signals are transmitted at a return downlink frequency range; and
the generating comprises converting from the return uplink frequency range to the return downlink frequency range.

44. The method of claim 37, wherein:
the receiving is by a wireless relay; and
the synchronizing comprises:
receiving a beacon signal at the gateway locations, the beacon signal transmitted from the relay;
receiving, at each gateway location, a respective loopback signal transmitted from the gateway location; and
phase-synchronizing, at each gateway location, the received respective loopback signal with the received beacon signal.

45. The method of claim 36, further comprising:
receiving feed input signals from the gateway locations; and
generating crosstalk-corrected feed signals as a function of the feed input signals and a stored crosstalk matrix.

46. The method of claim 45, further comprising:
sequentially coupling a loopback antenna element, over a plurality of time slots, with each of the focused feeder uplink antenna elements, thereby, in each of the time slots, transmitting a repeated loopback signal to the gateway locations in response to receiving a loopback beacon signal from the gateway location associated with the focused feeder uplink antenna element that is sequentially coupled in the time slot,
wherein, over the plurality of time slots, the feed input signals correspond to the repeated loopback signals as received at the gateway locations.

47. The method of claim 45, further comprising:
sequentially coupling a loopback antenna element, over a plurality of time slots, with each of a plurality of focused feeder downlink antenna elements, thereby, in each of the time slots, transmitting a repeated loopback signal to the gateway location associated with the focused feeder downlink antenna elements that is sequentially coupled in the time slot in response to receiving a loopback beacon signal from the gateway locations,
wherein, in each of the time slots, at least one of the feed input signals corresponds to the repeated loopback signal as received by at least one of the gateway locations in the time slot.

48. The method of claim 36, further comprising:
receiving at least one probe signal by at least one of the gateway locations from at least one user terminal; and
generating at least one crosstalk-corrected feed signal as a function of comparing the at least one probe signal with an expected feed signal.

49. The method of claim 36, further comprising:
receiving at least one probe signal by at least one user terminal from at least one of the gateway locations; and
generating at least one crosstalk-corrected feed signal as a function of comparing the at least one probe signal with an expected user signal.

* * * * *